(12) United States Patent
Kuninobu et al.

(10) Patent No.: US 11,957,981 B2
(45) Date of Patent: Apr. 16, 2024

(54) NON-TRANSITORY COMPUTER READABLE STORAGE MEDIUM, METHOD, AND SYSTEM

(71) Applicant: GREE, INC., Tokyo (JP)

(72) Inventors: Junsei Kuninobu, Minato-ku (JP); Ikuhiro Maeda, Minato-ku (JP); Gaku Mizukami, Minato-ku (JP); Yui Takeda, Minato-ku (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/958,204

(22) Filed: Sep. 30, 2022

(65) Prior Publication Data

US 2023/0029145 A1    Jan. 26, 2023

Related U.S. Application Data

(63) Continuation of application No. 16/798,259, filed on Feb. 21, 2020, now Pat. No. 11,491,402, which is a
(Continued)

(30) Foreign Application Priority Data

Sep. 17, 2014  (JP) .................................. 2014-189329

(51) Int. Cl.
*A63F 9/24*  (2006.01)
*A63F 11/00*  (2006.01)
(Continued)

(52) U.S. Cl.
CPC .......... *A63F 13/67* (2014.09); *A63F 13/2145* (2014.09); *A63F 13/533* (2014.09);
(Continued)

(58) Field of Classification Search
CPC .. G07F 17/32; G07F 17/3201; G07F 17/3222; G07F 17/3214
(Continued)

(56) References Cited

U.S. PATENT DOCUMENTS

2008/0076569 A1* 3/2008 Tabata .................... A63F 13/30
 463/41
2011/0136558 A1* 6/2011 Terada .................. A63F 13/426
 463/4
(Continued)

FOREIGN PATENT DOCUMENTS

JP  2003-079941 A  3/2003
JP  2007-075612 A  3/2007
(Continued)

OTHER PUBLICATIONS

Office Action dated Mar. 28, 2023, in corresponding Japanese Patent Application No. 2022-026465 (with English Translation), 7 pages.
(Continued)

*Primary Examiner* — Adetokunbo O Torimiro
(74) *Attorney, Agent, or Firm* — Oblon, McClelland, Maier & Neustadt, L.L.P.

(57) ABSTRACT

Provided is one or more non-transitory computer readable storage media including computer-program instructions, which when executed by a system, cause the system to: cause a terminal device to display, in a first area of a game screen of a game, a plurality of items associated with progress of the game in such a manner that at least some of the plurality of items are excluded from a first view; extract a specific item from the plurality of items, based on a status of the game; cause the terminal device to display, in the game screen, the specific item in a second area in the first view; and execute an operation based on an item selected from the plurality of items or the specific item.

18 Claims, 17 Drawing Sheets

Related U.S. Application Data continuation of application No. 14/856,338, filed on Sep. 16, 2015, now Pat. No. 10,603,592.

(51) Int. Cl.

| | | |
|---|---|---|
| *A63F 13/2145* | (2014.01) | |
| *A63F 13/533* | (2014.01) | |
| *A63F 13/67* | (2014.01) | |
| *A63F 13/822* | (2014.01) | |
| *G06F 3/04842* | (2022.01) | |
| *G06F 3/0485* | (2022.01) | |
| *G06F 3/0488* | (2022.01) | |
| *G06F 13/00* | (2006.01) | |
| *G06F 17/00* | (2019.01) | |

(52) U.S. Cl.
CPC ........ *A63F 13/822* (2014.09); *G06F 3/04842* (2013.01); *G06F 3/0485* (2013.01); *G06F 3/0488* (2013.01)

(58) Field of Classification Search
USPC .............................. 463/9, 10, 15, 29, 30, 31
See application file for complete search history.

(56) References Cited

U.S. PATENT DOCUMENTS

| 2012/0113228 A1* | 5/2012 | Konno | H04N 13/356 348/47 |
|---|---|---|---|
| 2014/0208333 A1* | 7/2014 | Beals | G06F 9/445 719/318 |

FOREIGN PATENT DOCUMENTS

| JP | 2007-296105 A | 11/2007 |
|---|---|---|
| JP | 2007-296106 A | 11/2007 |
| JP | 2010-142346 A | 7/2010 |
| JP | 2011-104391 A | 6/2011 |
| JP | 2012-143509 A | 8/2012 |
| JP | 2013-065290 A | 4/2013 |
| JP | 2013-198589 A | 10/2013 |
| JP | 7032483 B2 | 3/2022 |

OTHER PUBLICATIONS

Japanese Office Action dated May 29, 2018 in Patent Application No. 2015-190426 (with English translation), 9 pages.

Japanese Office Action dated Sep. 18, 2018 in Patent Application No. 2015-190426 (with English translation), 6 pages.

Japanese Office Action dated Dec. 18, 2015 in Patent Application No. 2014-189329 (with English translation), 7 pages.

Japanese Office Action dated Jan. 27, 2015, issued in Japanese Patent Application No. 2014-189329 (with English translation).

Japanese Office Action dated Apr. 28, 2015, issued in Japanese Patent Application No. 2014-189329 (with English translation).

Decision to Dismiss Amendment dated Aug. 25, 2015, issued in Japanese Patent Application No. 2014-189329 (with English translation).

Office Action issued Jan. 30, 2018 in corresponding Japanese Patent Application No. 2015-190426 (with English Translation), 11 pages.

[a [new work information] cavalry division] RPG "7 seven SAUZANDOWOZU which is commanded and will be fought in 100. the season II" and FAMI—connoisseur App, [ online], Jul. 3, 2013, [Jan. 18, 2018 search], URL, and https://app.famitsu.com/20130703_188969, 2 pages.

-[-I will go—part II! 10 KA ** (volume on battle) which Chen Cros capture] beginners should memorize—FAMI—connoisseur App, [online], Jun. 27, 2014, [Jan. 18, 2018 search], URL, and https://app.famitsu.com/20140627 398138, 7 pages.

Catherine, "That popular online game became an application! "lug NAROKU on-line VIOLET"", (It is reference about the description after [ convenient for the surroundings of determination/attack button of "controller] "there is the quick slot""), [ CatchApp, [online], Apr. 15, 2011, [Sep. 7, 2017 search] http: [/] URL/catchapp.net/contents/story/145, 5 pages.

Japanese Office Action issued on May 29, 2018 in Patent Application No. 2015-190426 (with English translation), 9 pages.

Yama Chan, "Only One More Game . . . The First Card Game in Blizzard [Hearthstone: Heroes of Warcraft ]", 4Gamer.net, search, URL, and http://www.4gamer.net/games/209/G020915/20140129091/, [online] Jan. 30, 2014, May 10, 2018, pp. 1-7.

"King DM-GX Spirit Summoner" Master OBU Spirit, Shueisha, Inc., Mar. 17, 2008, 3rd Edition, pp. 7-9, 5,103,117,122 and cover pages.

Japanese Office Action issued on Sep. 18, 2018 in Patent Application No. 2015-190426 (with English translation), 6 pages.

Japanese Office Action issued on Dec. 18, 2015 in Patent Application No. 2014-189329 (with English translation), 7 pages.

Office Action dated Nov. 7, 2019 issued in corresponding Japanese Patent Application No. 2018-232544 with English Translation.

Final Fantasy IV the After Years—Return of the Moon—, Strategy guide (with English explanation of relevance). Oct. 29, 2019.

The Fastest App Switching Tool! You can also grasp the status quickly (with English explanation of relevance). Jul. 31, 2015.

Fantasy Action RPG Queen's Crown 2, Delivery started on Google Play (with English explanation of relevance). Sep. 7, 2017.

Proposal Square, Awakened Adventurer's Square (with English explanation of relevance). Oct. 29, 2019.

[Diablo 3] Auction Housing In 1.0.4, posted Aug. 22, 2012, https://www.youtube.com/watch?v=n433ELsSPwM.

Kamran, Immersive UI in RPGs—Thoughts, Concerns, et al. Published On Thursday, Sep. 15, 2011, https://kamranicus.com/posts/2011-09-14-immersive-ui-in-rpgs-thoughts-concerns-et al.

"Marvel Puzzle Quest: Dark Reign—Gameplay/Review/First Impressions" video posted by Brbteabreak posted on Dec. 6, 2013 https://www.youtube.com/watch?v=gfF4dAq4wEQ.

* cited by examiner

FIG. 2

| Player | Character | Belonging group |
|---|---|---|
| Player A 1 | Character A 1 | A |
| Player A 2 | Character A 2 | A |
| Player A 3 | Character A 3 | A |
| Player A 4 | Character A 4 | A |
| Player A 5 | Character A 5 | A |
| Player B 1 | Character B 1 | B |
| Player B 2 | Character B 2 | B |
| Player B 3 | Character B 3 | B |
| Player B 4 | Character B 4 | B |
| Player B 5 | Character B 5 | B |

FIG. 3

| Category | Single/Multiple | Action | Remaining number of usable times | Value of necessary action points parameter |
|---|---|---|---|---|
| Attack | Single | Single normal attack | – | 5 |
| | | Single special attack 1 | 7 | 10 |
| | | Single special attack 2 | 10 | 10 |
| | | : | | |
| | | Single special attack n | 8 | 20 |
| | Multiple | Multiple normal attack | 10 | 10 |
| | | Multiple special attack 1 | 6 | 20 |
| | | Multiple special attack 2 | 5 | 30 |
| | | : | | |
| | | Multiple special attack n | 2 | 50 |
| Assist | Single | Single normal assist | – | 5 |
| | | Single special assist 1 | 9 | 10 |
| | | : | | |
| | | Single special assist n | 4 | 20 |
| | Multiple | Multiple assist 1 | 8 | 20 |
| | | : | | |
| | | Multiple assist n | 2 | 40 |
| Recovery | Single | Self-recovery | – | 5 |
| | | Revival | 1 | 10 |
| | Multiple | Multiple recovery 1 | 8 | 30 |
| | | : | | |
| | | Multiple recovery n | 4 | 40 |

FIG. 4

| Character | Body strength parameter |
|---|---|
| Character A 1 | 80 |
| Character A 2 | 75 |
| Character A 3 | 100 |
| Character A 4 | 90 |
| Character A 5 | 60 |
| Character B 1 | 65 |
| Character B 2 | 80 |
| Character B 3 | 95 |
| Character B 4 | 70 |
| Character B 5 | 80 |
| Fort A | 840 |
| Fort B | 790 |

FIG. 5

| Character | Attach strength parameter | Defense strength parameter |
|---|---|---|
| Character A 1 | 75 | 60 |
| Character A 2 | 90 | 95 |
| Character A 3 | 65 | 80 |
| Character A 4 | 60 | 70 |
| Character A 5 | 80 | 85 |
| Character B 1 | 90 | 70 |
| Character B 2 | 85 | 75 |
| Character B 3 | 70 | 80 |
| Character B 4 | 80 | 65 |
| Character B 5 | 65 | 70 |

FIG. 6

| Character | Action points parameter |
|---|---|
| Character A 1 | 50 |
| Character A 2 | 100 |
| Character A 3 | 60 |
| Character A 4 | 70 |
| Character A 5 | 80 |
| Character B 1 | 20 |
| Character B 2 | 10 |
| Character B 3 | 0 |
| Character B 4 | 30 |
| Character B 5 | 20 |

NON-TRANSITORY COMPUTER READABLE STORAGE MEDIUM, METHOD, AND SYSTEM

CROSS-REFERENCE TO RELATED APPLICATION

This application is a continuation of U.S. application Ser. No. 16/798,259, filed, Feb. 21, 2020, which is a continuation of U.S. application Ser. No. 14/856,338, filed, Sep. 16, 2015, which claims priority to and the benefit of Japanese Patent Application No. 2014-189329, filed Sep. 17, 2014; the entire contents of each of which are incorporated herein by reference.

TECHNICAL FIELD

This disclosure relates to a non-transitory computer readable storage medium, a control method, and an information processing device.

BACKGROUND

Conventionally, as a video game using an information processing device such as a computer and the like, a battle game in which a player operates a character in the game and thus battles against an opponent has been known. For example, JP 2007-075612 A describes a game in which the player selects a command in each turn to determine a performance of a character and thus advances a battle.

SUMMARY

Incidentally, when the character may execute a plurality of commands, the player needs to find a desired command to be selected from a display screen of the game. However, when the player needs to find the command by carrying out a scroll operation and the like due to a size limitation of the display screen and the like, the player may feel cumbersome.

Therefore, it could be helpful to provide a non-transitory computer readable storage medium, a control method, and an information processing device those reduce cumbersome operations.

One of the disclosed aspects therefore provides one or more non-transitory computer readable storage media including computer-program instructions, which when executed by a system, cause the system to:

cause a terminal device to display, in a first area of a game screen of a game, a plurality of items associated with progress of the game in such a manner that at least some of the plurality of items are excluded from a first view;

extract a specific item from the plurality of items, based on a status of the game;

cause the terminal device to display, in the game screen, the specific item in a second area in the first view; and execute an operation based on an item selected from the plurality of items or the specific item.

According to the non-transitory computer readable storage medium, preferably, the extraction includes identifying the specific item based on stored history information indicating that the specific item was previously selected.

According to the non-transitory computer readable storage medium, preferably, the plurality of items are classified into a plurality of categories, and the computer-program instructions cause the system to: cause the terminal device to display a tab corresponding to each of the categories in the first area.

According to the non-transitory computer readable storage medium, preferably, the extraction includes extracting the specific item from one of the plurality of categories corresponding to selection of one of the tabs.

According to the non-transitory computer readable storage medium, preferably, the computer-program instructions cause the system to:

extract, when another tab different from the selected tab is subsequently selected, another specific item from the plurality of items corresponding to another one of the plurality of categories corresponding to the another tab; and cause the terminal device to display the another specific item in the second area.

According to the non-transitory computer readable storage medium, preferably, the second area is displayed in the first view of the game screen.

According to the non-transitory computer readable storage medium, preferably, the second area is displayed between an area for displaying information indicating the progress of the game and the first area.

According to the non-transitory computer readable storage medium, preferably, the computer-program instructions cause the system to:

determine whether an operation based on each of the plurality of items is executable, wherein the extraction includes extracting the specific item from the items determined to be executable.

According to the non-transitory computer readable storage medium, preferably, the plurality of items represent actions executable by a game medium used in the game.

According to the non-transitory computer readable storage medium, preferably, the game is a battle game.

According to the non-transitory computer readable storage medium, preferably, the second area is displayed between an area for displaying a playing field indicating the progress of the battle game and the first area.

According to the non-transitory computer readable storage medium, preferably, the plurality of items are each classified into one of an attack category, an assist category and a recovery category.

According to the non-transitory computer readable storage medium, preferably, the computer-program instructions cause the system to:

cause the terminal device to display, in the first area, a first tab corresponding to the attack category, a second tab corresponding to the assist category and a third tab corresponding to the recovery category.

According to the non-transitory computer readable storage medium, preferably, the computer-program instructions cause the system to:

receive a notification from the terminal device indicating a selection of one of the first tab, the second tab and the third tab.

According to the non-transitory computer readable storage medium, preferably, the extracting includes extracting the specific item from the attack category when the notification indicates that first tab is selected, extracting the specific item from the assist category when the notification indicates that the second tab is selected and extracting the specific item from the recovery category when the notification indicates that the third tab is selected.

According to the non-transitory computer readable storage medium, preferably, the at least some of the plurality of items excluded from the first view are capable of being displayed by performing a scrolling operation at the terminal device.

According to the non-transitory computer readable storage medium, preferably, the system is a server including a communication interface configured to communicate with the terminal device via a network.

Note that the present disclosure may be implemented by a method and a system that substantially correspond to the non-transitory computer readable storage medium described above. Therefore, it should be appreciated that such a method and a system are also included within the scope of the present disclosure.

For example, our method is a method comprising:
causing, by circuitry, a terminal device to display, in a first area of a game screen of a game, a plurality of items associated with progress of the game in such a manner that at least some of the plurality of items are excluded from a first view;
extracting, by the circuitry, a specific item from the plurality of items based on a status of the game;
causing, by the circuitry, the terminal device to display, in the game screen, the specific item in a second area in the first view; and
executing, by the circuitry, an operation based on an item selected from the plurality of items or the specific item.

Also, our system is a system comprising:
circuitry configured to
cause a terminal device to display, in a first area of a game screen of a game, a plurality of items associated with progress of the game in such a manner that at least some of the plurality of items are excluded from a first view;
extract a specific item from the plurality of items, based on a status of the game;
cause the terminal device to display, in the game screen, the specific item in a second area in the first view; and
execute an operation based on an item selected from the plurality of items or the specific item.

According to our non-transitory computer readable storage medium, method, and system, cumbersome operations may be reduced.

BRIEF DESCRIPTION OF THE DRAWINGS

In the accompanying drawings:
FIG. 2 is a diagram schematically illustrating an example of information stored in a storage module;
FIG. 3 is a diagram schematically illustrating examples of actions of characters stored in the storage module;
FIG. 4 is a diagram schematically illustrating an example of a table managed by a health point parameter management module;
FIG. 5 is a diagram schematically illustrating an example of a table managed by a combat power parameter management module;
FIG. 6 is a diagram schematically illustrating an example of a table managed by an action points parameter management module.

DETAILED DESCRIPTION

Figure 1:
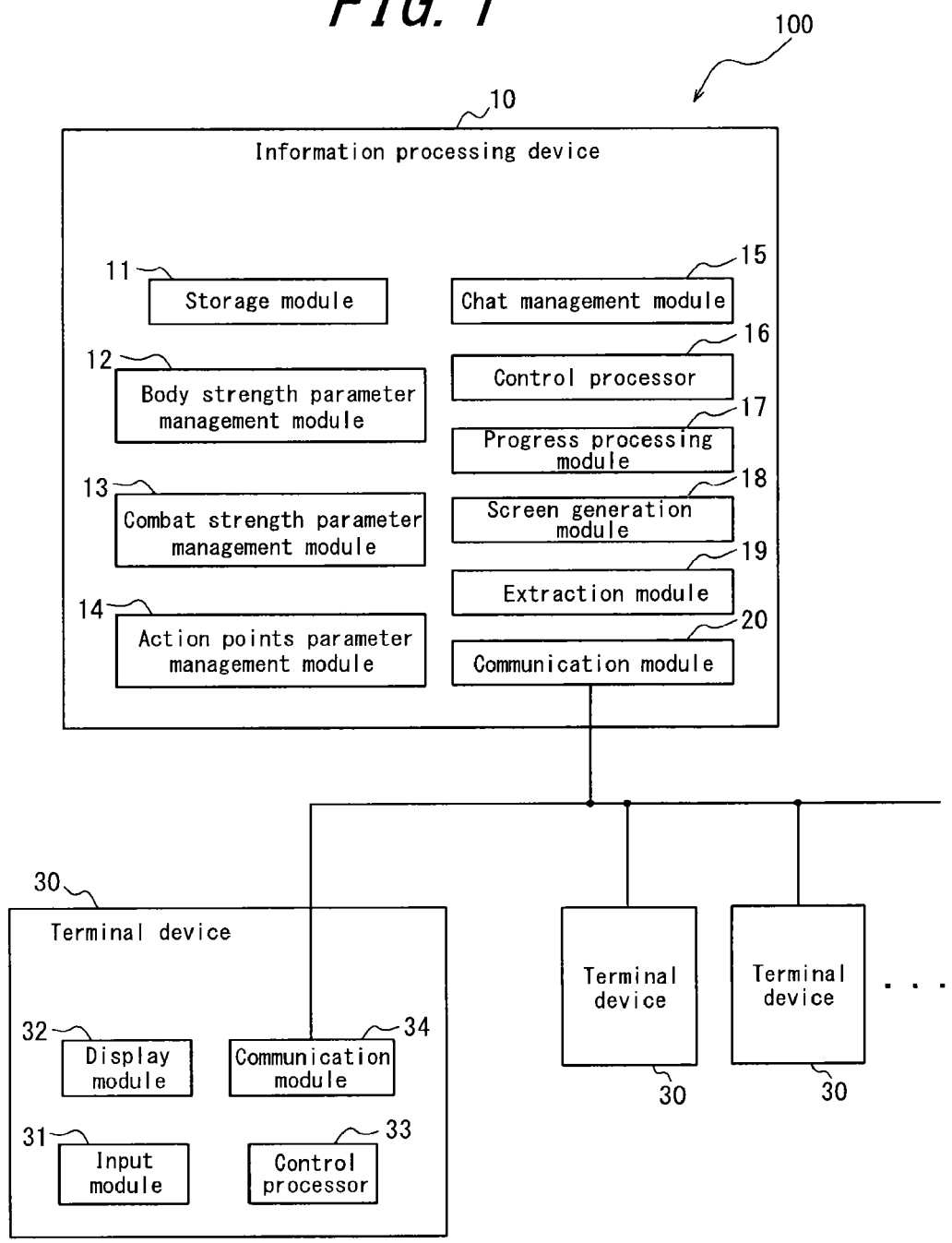
FIG. 1 is a functional block diagram of a main section of an information processing system according to one embodiment.

Hereinafter, one of the embodiments will be described with reference to the accompanying drawings.

First, an outline of a game according to the present embodiment will be described. The game according to the present embodiment includes a first mode and a second mode. In the first mode, a player, by battling against an opponent by using a player's game medium or by winning a normal quest in the game, may obtain the game medium such as, for example, an item and the like that may be used in the game.

On the other hand, the second mode is implemented as, for example, an event for a limited time. In the second mode, a plurality of groups, each of which is made up of a plurality of players, battle against one another in real time. Hereinafter, the second mode of the game according to the present embodiment will be described, unless otherwise specified.

The present embodiment is described assuming that two groups, a group A and a group B, battle against each other. Each player deploys the player's game medium in a field of the game and operates the game medium to move or execute attack and the like, thereby advancing the game (a battle in the second mode). The game medium corresponds to electronic data used in the game and may include, for example, a card, an item, a character, an avatar, and the like. Also, the game medium corresponds to the electric data that may be, depending on the progress of the game, obtained, kept, used, managed, exchanged, synthesized, enhanced, sold, discarded, and/or given by the player. However, a mode of use of the game medium is not limited to those specified herein. The present embodiment is described on the assumption that the game medium includes the character.

In the game according to the present embodiment, the groups' turn alternately at predetermined intervals. According to the present embodiment, the interval is 1 minute; the group A turns for 1 minute, followed by the turn of the group B for 1 minute, and then back to the turn of the group A for 1 minute. This is repeated until a predetermined battling time (for example, 30 minutes) is up or one of the groups satisfies a game winning condition before the battling time is up.

Each player, during the turn of the group to which each player belongs (hereinafter, also referred to as a "player's group"), may move a character for a predetermined number of times (for example, once) in the field of the battle. Also, regardless of whether it is turn for the player's group, each player may advance the game by selecting an item such as an action or the like executable by the character. The character, based on the selected action, attacks the character of an opponent group or a representative game medium of the opponent group. The representative game medium corresponds to electronic data used in the game in a manner similar to the game media described above and is a fort according to the present embodiment. Each character and each fort have a parameter associated with their health point (a health point parameter). The group wins by making the health point parameter of the fort of the opponent group zero or by having a higher health point parameter of the fort when the battling time is up.

In the game according to the present embodiment, also, the player may exchange information and discuss about how to advance the battle (a strategy) with another player of the same group by using a chat function during the battle.

FIG. 1 is a functional block diagram of a main section of an information processing system according to one embodiment. The information processing system 100 includes an information processing device 10 and a plurality of terminal devices 30. In one implementation, the information processing device 10 includes one or more computing devices, such as servers with processors having circuitry configured to perform one or more software module processes described herein. The information processing device 10 can also be implemented over a plurality of information processing devices, such as in a cloud computing environment. The information processing device 10 according to the present embodiment communicates with the terminal device 30 of each player of the game. The information processing device 10 advances the game based on an input operation carried out by each player using an input module 31 of the terminal device 30. Also, the information processing device 10 displays a progress status of the game in a display module 32 of the terminal device 30 of each player. In particular, the information processing device 10 generates information to be displayed in the display module 32 of the terminal device 30 and transmits (outputs) the information to the terminal device 30.

The information processing device 10 includes a storage module 11, a health point parameter management module 12, a combat power parameter management module 13, an action points parameter management module 14, a chat management module 15, a control processor 16, a progress processing module 17, a screen generation module 18, an extraction module 19, and a communication module 20. The term "module" used throughout the disclosure refers to one or more software processes that are executed by circuitry of a processor of the information processing device 10 that are associated with one or more functions of the game. For example, the chat management module 15 refers to the software processes executed by the information processing device 10 that are associated with managing a chat function of the game.

The storage module 11 stores various information used in the game. The storage module 11 stores a plurality of game media used by the players in the game in association with the groups of the players. The storage module 11, as schematically illustrated in FIG. 2 for illustrative purposes, stores a table associating the players of the game, the characters operated by the players, and the player's group together. As can be seen in FIG. 2, for example, a player A1 belongs to a group A and can operate a character A1. The storage module 11, also, in a manner similar to FIG. 2, stores a representative game medium of each group for battling in the game in association with each group. However, since the representative game medium is not associated with the player, the representative game medium is stored in the storage module 11 in a state being associated with either the group A or the group B rather than the player.

Also, the storage module 11 stores information specific to each character. The information specific to each character includes a plurality of items executable by the game medium, the combat power of the game medium such as attack power and defense power, a battling means of the game medium such as an offensive means and a defensive means, skill information of the game medium, information about an avatar of the game medium, a property of the game medium, an index indicative of a degree of rarity of the game medium, and the like. The index indicative of the degree of rarity of the game medium may be represented by levels such as normal, rare, super rare, ultra rare, and the like. In the present embodiment, the information specific to each character includes a plurality of items executable by the game medium.

A plurality of items executable by the game medium may be selected by the player based on the progress of the game. The game advances when the progress processing module 17 carries out an operation based on a selected item. A plurality of items may be any items associated with the progress of the game and, according to the present embodiment, actions executable by the characters. When the player selects the action of the character, the progress processing module 17, based on the selected action, changes various parameters and the screen of the game displayed in the display module 32 of the terminal device 30.

The storage module 11, as schematically illustrated in FIG. 3 for illustrative purposes, stores the actions executable by the characters. Each character has different executable action. A table in FIG. 3, accordingly, shows actions executable by one of the characters used in the game. According to the present embodiment, as illustrated in FIG. 3, the actions are classified into three categories: attack, assist, and recovery. Each action is classified into the category based on an attribute thereof. The attribute of the action is a feature specific to the action such as, for example, which parameter is changed when the action is processed by the progress processing module 17. An attack category includes an action to change the health point parameter of the character of the opponent group. A assist category includes an action to change the combat power parameter of the character. A recovery category includes an action to change the health point parameter of the character of the same group. Note that each action may be classified into a category that may be set by the player as desired.

The action, in each category, is further classified into an action for affecting the parameter of a single character or an action for affecting the parameters of a plurality of characters. Each action has a different effect of changing the parameter, such as an increasing/reducing amount of the parameter and an increasing/reducing ratio of the parameter. Some of the actions have limitation on the number of usable times at the start of the game. The storage module 11, as illustrated in FIG. 3, stores the remaining number of times of each action usable by the character. However, the remaining number of usable times of an action having no limitation on the number of usable times is not stored in the storage module 11. The remaining number of usable times of such an action is represented by "-" in FIG. 3. For each action, further, a value of the action points parameter necessary for execution thereof is predetermined and also stored in the storage module 11. Each character executes the action by consuming a value of the action points parameter thereof. When the character has the action points parameter at a value insufficient for execution of an action, the character cannot execute the action. In general, the higher effect an action has, the lower the remaining number of usable times is set at the start of the game and, also, the higher the value of the necessary action points parameter is set. An action with a higher effect is an action that may increase or reduce the parameter by a greater amount.

Further, the storage module 11, after the start of the game, may store a record of an operation associated with the progress of the game carried out by the progress processing module 17 until the end of the game.

The health point parameter management module 12 manages the health point parameters of each character and the fort. The health point parameter management module 12 manages the health point parameters of each character and the fort in a table schematically illustrated in FIG. 4 for illustrative purposes. As illustrated in FIG. 4, the table of the health point parameter management module 12 includes the health point parameter of each of the character A1 to a character A5, the character B1 to a character B5, and the forts A and B. When the player selects any one of the actions under the attack category, the progress processing module 17, based on the selected action, reduces the health point parameter stored in the table of the health point parameter management module 12. When the health point parameter of the character falls down to zero, the character cannot participate in the game.

The combat power parameter management module 13 manages a parameter associated with the combat power (the combat power parameter) of each character. The combat power parameter according to the present embodiment includes the attack power parameter and the defense power parameter. The battling parameter management module 13 manages the attack power parameter and the defense power parameter of each character in a table schematically illustrated in FIG. 5 for illustrative purposes. As illustrated in FIG. 5, the table of the combat power parameter management module 13 includes the attack power parameter and the defense power parameter of each of the character A1 to the character A5 and the character B1 to the character B5. When the player selects any one of the actions under the assist category, the progress processing module 17, based on the selected action, changes the attack power parameter and the defense power parameter stored in the table of the combat power parameter management module 13. Also, when the player selects any one of the actions under the attack category, the progress processing module 17, based on the selected action, determines an amount to reduce (a reducing amount of) the health point parameter with reference to the attack power parameter and the defense power parameter stored in the table of the combat power parameter management module 13.

The action points parameter management module 14 manages a parameter associated with the action points (an action points parameter) necessary for the character to execute the action. The action points parameter management module 14 manages the action points parameter of each character in a table schematically illustrated in FIG. 6 for illustrative purposes. As illustrated in FIG. 6, the table of the action points parameter management module 14 includes the action points parameter of each of the character A1 to the character A5 and the character B1 to the character B5. Each player advances the game by consuming the action points parameter of the character. The action points parameter increases or decreases based on the progress of the game and execution of the action. For example, when the character executes the action based on a player's selection, the progress processing module 17 reduces the action points parameter of the character by a value of the action points parameter necessary for execution of the action. When the value of the action points parameter of the character is lower than the value of the action points parameter necessary for executing the action, the player cannot select the action to be executed by the character. Also, the action points parameter of the character is increased by the progress processing module 17 under a predetermined condition. For example, the action points parameter of the character is increased each time the turn of the group to which the player operating the character belongs starts (i.e., once in 2 minutes according to the present embodiment). An increasing amount of the action points parameter may be at a certain ratio or a certain value and, according to the present embodiment, 50 for each time. The action points parameter may have an upper limit, which is 100 according to the present embodiment.

The chat management module 15 manages the chat function of the game according to the present embodiment. The chat management module 15 may store a fixed phrase and/or image that is likely to be frequently used during the game. The fixed phrase may include, for example, "Attack!" for urging another player of the same group to execute the action under the attack category, "Assist me!" for urging another player of the same group to execute the action under the assist category, and "Attack the fort!" for urging another player of the same group to attack the representative game medium of the opponent group. The chat management module 15 may store a phrase preliminarily input by each player by using the input module 31 of the terminal device 30 as the fixed phrase.

The control processor 16 controls and manages the entire information processing device 100 including each functional block thereof. The control processor 16 is constituted by using a processor such as a CPU (Central Processing module) for executing a program that defines a control procedure of the game. The program is stored in the storage module 11 or an external storage medium.

The progress processing module 17 carries out an operation associated with the progress of the game according to the present embodiment. The progress processing module 17, when the number of players participating in the game according to the present embodiment reaches a predetermined number or higher, that is, when the number of players (or a character corresponding to the player in a one-to-one manner) stored in the storage module 11 reaches the predetermined number or higher, starts an advancing operation of the game. The progress processing module 17, when the number of players participating in the game is under the predetermined number and, for example, the control processor 16 adds a player to be controlled autonomously to the game, may start the advancing operation of the game. Also, the progress processing module 17, based on an input operation by the player via the input module 31 of the terminal device 30, moves the character in the field. Also, the progress processing module 17 carries out an operation based on the action selected by the player via the input module 31 of the terminal device 30. In particular, the progress processing module 17, based on the executed action, increases or reduces the parameters of the table of each of the health point parameter management module 12, the combat power parameter manage module 13, and the action points parameter management module 14. Further, the progress management module 17 manages a predetermined game time and time for each group's turn.

The progress processing module 17 determines a winner of the game. In the game according to the present embodiment, the progress processing module 17, when the health point parameter of one of the representative game media falls down to zero, determines the group other than the group having the representative game media with the health point parameter zero, as the winner. The progress processing module 17, when the predetermined game time ends and the health point parameters of the representative game media of both groups are larger than zero, determines the group having the representative game medium with a higher value of the remaining health point parameter as the winner.

Figure 7:
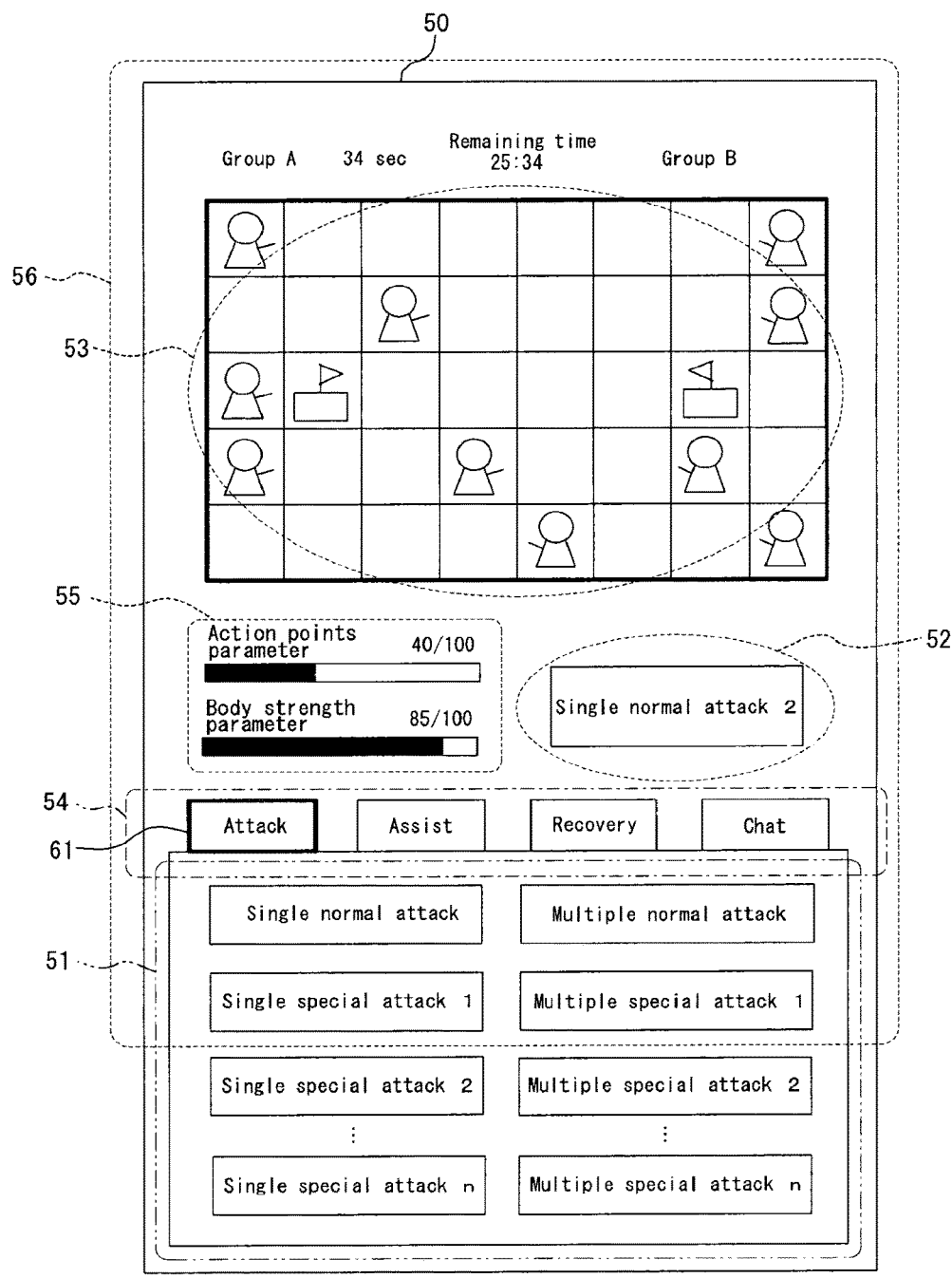
FIG. 7 is a diagram schematically illustrating an example of a game screen of a game generated by a screen generation module.

The screen generation module 18 generates information for displaying the game screen including information about the game (hereinafter, also referred to as a "game screen"). FIG. 7 is a diagram schematically illustrating an example of the game screen of the game generated by the screen generation module 18. A game screen 50 includes a first area 51, a second area 52, a field display area 53, a tub display area 54, and a parameter display area 55. The second area 52 is arranged at a particular position in the game screen, that is, according to the present embodiment, the second area 52, as illustrated in FIG. 7, is arranged between the field display area 53 for displaying the information about the progress of the game and the first area 51.

In the tab display area 54, each of three tabs represent different category of the action: the attack category, the recovery category, and the assist category, and one tab represents the chat function. In the first area 51, the item associated with the tab selected by the player is selectively displayed in a tab form for each category. In FIG. 7, since an attack tab 61 is being selected, the first area 51 selectably displays a plurality of actions (items) under the attack category. The second area 52 selectably displays a specific action extracted from the actions executable by the character. Preferably, the second area 52 selectably displays the specific action extracted from the actions in the selected tab. That is, the second area 52 selectably displays the specific action extracted by the extraction module 19 from a plurality of actions displayed in the first area 51. In FIG. 7, an action "a single special attack 2" is extracted from a plurality of actions under the attack category and, as a result, generated in the game screen 50. An extraction operation of the extraction module 19 will be described in detail later. Note that the first area 51 and the second area 52, in association with each of the actions, may display the remaining number of usable times of each action or the value of the action points parameter necessary for execution of each action.

The field display area 53 displays the information about the progress of the game. The field display area 53, for example, displays the field of the game as well as a plurality of characters and representative game media (the forts) arranged in the field and used in the game. Although in FIG. 7 the field is made up of five squares in a vertical direction and eight squares in a horizontal direction, a shape and the number of squares of the field is not limited thereto.

The parameter display area 55 displays information about various parameters. Although in FIG. 7 the action points parameter and the health point parameter of the character operated by the player are displayed, the information about the parameter displayed in the parameter display area 55 is not limited thereto. The parameter display area 55 may display information about the combat power parameter of the character operated by the player, or information about various parameters of the representative game medium or another character not operated by the player. Also, the parameter may be displayed in the form of a stick indicator or a number, or both of them, as illustrated in FIG. 7.

Although the display module 32 of the terminal device 30 displays the game screen, the display module 32, depending on a size thereof, may not display the entire game screen 50. In such a case, the display module 32 partially displays the game screen 50. An area surrounded by dotted lines 56 in FIG. 7 is an example of a range of the game screen displayed in the display module 32 and represents a first view. In a first view 56, the entire field display area 53 and second area 52 are displayed, while the first area 51 is partially displayed. In order for the player to select an action that is not displayed in the first view 56 (i.e., "single special attack 2" to "single special attack n" and "multiple special attack 2" to "multiple special attack n" in FIG. 7), the player needs to flick or swipe the screen (a display screen) displayed in the display module 32 such that a desired action is displayed and then select the action. As illustrated in FIG. 7, however, since the action extracted to the second area 52 is contained in the first view 56, the player may select the action without flicking or swiping the screen.

The extraction module 19 extracts the specific item to be selectably displayed in the second area 52 from a plurality of items selectably displayed in the first area 51. The extraction operation carried out by the extraction module 19 according to the present embodiment will be described in detail later.

The communication module 20, by using a wired communication or a radio communication, exchanges data used in the game with the terminal device 30 used by each player of the game.

The terminal device 30 includes the input module 31, the display module 32, a control processor 33, and a communication module 34. The terminal device 30 may be a dedicated gaming machine. Or, the terminal device 30 may be constituted by using an electronic device (an information processing device) such as a mobile phone, a tablet terminal, and the like.

The input module 31 receives an input operation from the player. The input module 31 may be constituted by using an operation button (an operation key). When the terminal device 30 has a touch panel, the touch panel receives the input operation by detecting a contact of the player's finger or a styles pen and thus functions as the input module 31.

The display module 32 is a display device such as a liquid crystal display, an organic EL display, or an inorganic EL display. The display module 32, based on the progress status of the game, displays various information about the game received from the information processing device 10.

The control processor 33 is a processor for controlling and managing the entire terminal device 30 including each functional block thereof.

The communication module 34 carries out the wired communication or the radio communication with the information processing device 10 for executing the game and thus exchanges the data used in the game.

Next, an example of the extraction operation carried out by the extraction module 19 will be described. The extraction module 19, based on the battle status of the game, extracts the specific action to be displayed in the second area 52 of the display screen from the actions executable by the character. Preferably, the extraction module 19 extracts the specific action from the actions in the tab selected by the player. According to the present embodiment, the extraction module 19, when an action is already selected under each category (in each tab) after the start of the game, extracts the action selected by the player last time as the action to be displayed in the second area 52 of the display screen. However, when the remaining number of usable times of this action is zero or when the character has the action points parameter lower than that necessary for the execution of the action, the player cannot select this action. In such a case, the extraction module 19, under each category, extracts another action such as, for example, a default action, as the action to be displayed in the second area 52 of the display screen. The default action is an action determined for each category on a basis of a predetermined standard and, according to the present embodiment, has no limitation on the number of usable times. When there are a plurality of actions having no limitation on the number of usable times, the default action is selected from a plurality of corresponding actions by the progress processing module 17. The default action may be preselected by the user by inputting to the input module 31. The extraction module 19 determines whether the operation based on each action is executable as described above and, from actions determined as executable, extracts the action to be displayed in the second area 52. In this manner, the extraction module 19 extracts the executable action based on the battle status of the game. According to certain embodiments, the processes associated with the extraction module 19 may be performed by the terminal device 30. For example, the control processor 33 may be configured to select the extracted function based on a specific size of the display of the terminal device 30.

After the start of the game, on the other hand, when the action has not been selected under each category, the extraction module 19, under each category, extracts the default action to be displayed in the second area 52 of the display screen.

By using the attack category as an example, the operation of the extraction module 19 will be further described. Under the attack category, "single normal attack" is predetermined as the default action. After the start of the game, when the player has not selected an action under the attack category, the extraction module 10 extracts the "single normal attack" serving as the default action. It is assumed that, thereafter, the player selects an action under the attack category when the game advances. When the action selected by the player last time is the "single special attack 1", the extraction module 19 extracts the "single special attack 1" at a point. When the "attack" tab is selected in the tab display area 54 of the display screen, the extracted action is displayed in the second area 52. A similar operation is carried out for the action under the assist category and the action under the recovery category.

Also, the extraction module 19, when another tab is selected by the player's operation, newly extracts the specific item from a plurality of items under the category of the selected tab. For example, when an "attack" tab has been selected and then a "assist" tab is newly selected, the extraction module 19 newly extracts the specific item from a plurality of items in the "assist" category.

Figure 8:
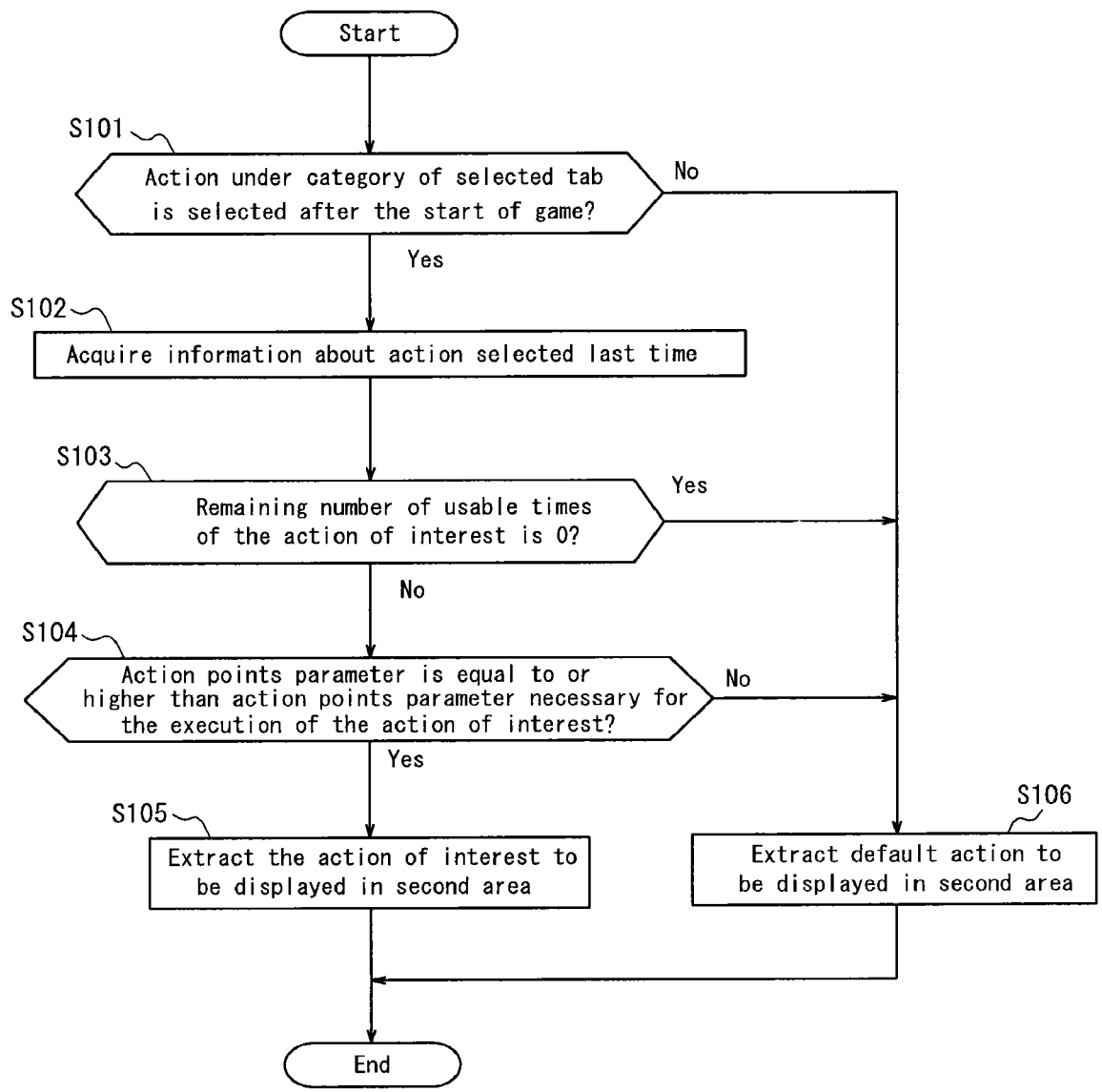
FIG. 8 is a flowchart illustrating an example of an extraction operation carried out by an extraction module.

FIG. 8 is a flowchart illustrating an example of the extraction operation carried out by the extraction module 19. When any one of the "attack" tab, the "assist" tab, and the "recovery" tab is selected during the game, the extraction module 19 repeats a flow illustrated in FIG. 8.

First, the extraction module 19 determines whether any one of the actions under the category of the selected tab is selected by the player after the start of the game (step S101). This determination is made by referring to, for example, the record of the operation carried out by the progress processing 17 stored in the storage module 11.

When the extraction module 19 determines that no action has been selected under the category of the selected tab since the start of the game (No of step S101), the extraction module 19 extracts the default action to be displayed in the second area 52 of the display screen (step S106). Then, the extraction module 19 ends the flow.

On the other hand, when the extraction module 19 determines that any one of the actions is selected by the player under the category of the selected tab after the start of the game (Yes of step S101), the extraction module 19 refers to the storage module 11 and acquires information about the action selected in the selected tab last time (step S102).

Then, the extraction module 19 refers to the table in the storage module 11 as illustrated in FIG. 3, for example, and determines whether the remaining number of usable times of the action, information about which has been acquired, is zero (step S103).

When the extraction module 19 determines that the remaining number of usable times of the action is zero (Yes at step S103), the extraction module 19 extracts the default action to be displayed in the second area 52 of the display screen (step S106). Then, the extraction module 19 ends the flow.

On the other hand, when the extraction module 19 determines that the remaining number of usable times of the action is other than zero (i.e., 1 or more) (No at step S103), the extraction module 19 refers to the table of the action points parameter management module 14 as illustrated in FIG. 6, for example, and determines whether the action points parameter of the character is equal to or higher than that necessary for the execution of the action, information about which has been acquired (step S104).

When the extraction module 19 determines that the action points parameter of the character is lower than that for the execution of the action information about which has been acquired (No at step S104), the extraction module 19 extracts the default action to be displayed in the second area 52 of the display screen (step S106). Then, the extraction module 19 ends the flow.

On the other hand, when the extraction module 19 determines that the action points parameter of the character is equal to or higher than that necessary for the execution of the action information about which has been acquired (Yes at step S104), the extraction module 19 extracts the action information about which has been acquired to be displayed in the second area 52 of the display screen (step S105).

In this manner, the extraction module 19 extracts the action to be displayed in the second area 52 of the display screen. The extracted action is used by the screen generation module 18 to generate the display screen.

Next, the game executed by the information processing device 10 according to the present embodiment will be described in detail. Here, with reference to FIG. 9 to FIG. 15 those illustrating the screen displayed in the display module 32 of the player A1, the game will be described. The player A1 belongs to the group A.

Figure 9:
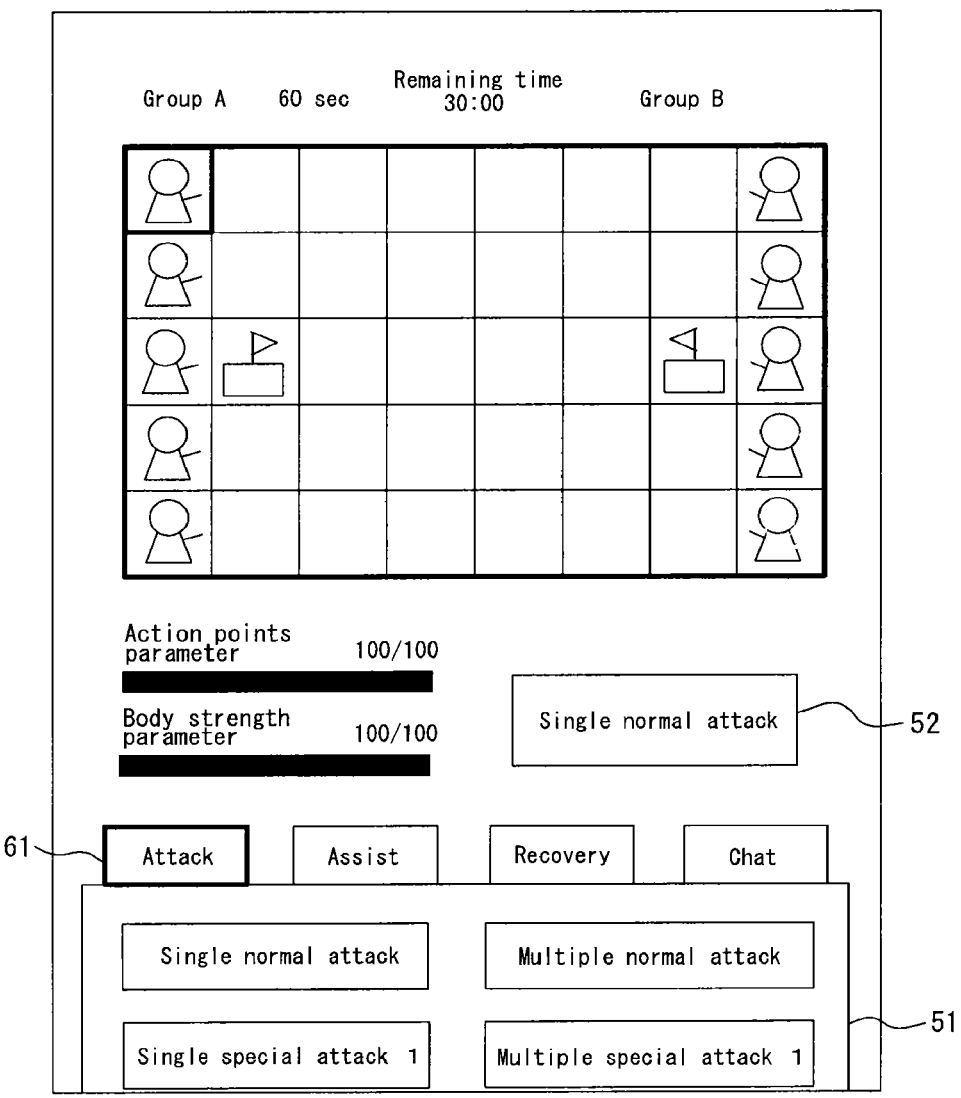
FIG. 9 is a diagram illustrating an example of progress of the game.

FIG. 9 illustrates the display screen displayed at the start of the game. The characters of each of the group A and the group B are lined up in squares at the left end and the light end of the field. Each of the characters and each of the representative game media are displayed by the screen generation module 18 in such a manner as to allow distinction between the groups to which each of the characters and each of the representative game media belong. For example, each of the characters and each of the representative game media are distinguishably displayed in white or black, in the shape of a robot or a human, or in an orientation such as the left or the right. Or, each of the characters and each of the representative game media may be displayed having a label such as an emblem or a banner attached thereto so as to allow the distinction between the groups. According to the present embodiment, the groups may be distinguished based on the orientation.

Also, the character operated by each player may be displayed, under the control by the screen generation module 18, in such a manner as to allow the distinction from other characters in the display screen displayed in the display module 32 of the terminal device 30 of each player. For example, the character operated by the player is displayed larger than the other characters, or positioned in the square that is blinking or emphasized, so as to allow the distinction. According to the present embodiment, as illustrated in the upper left square of the field, the square in which the character A1 operated by the player A1 is positioned is surrounded by bold lines, so as to allow the distinction.

At the start of the game, the screen generation module 18 autonomously selects the attack tab 61. Since at the start of the game no action has been selected by the player, the "single normal attack" serving as the default action under the attach category is extracted by the extraction module 19 and displayed in the second area 52.

Figure 10:
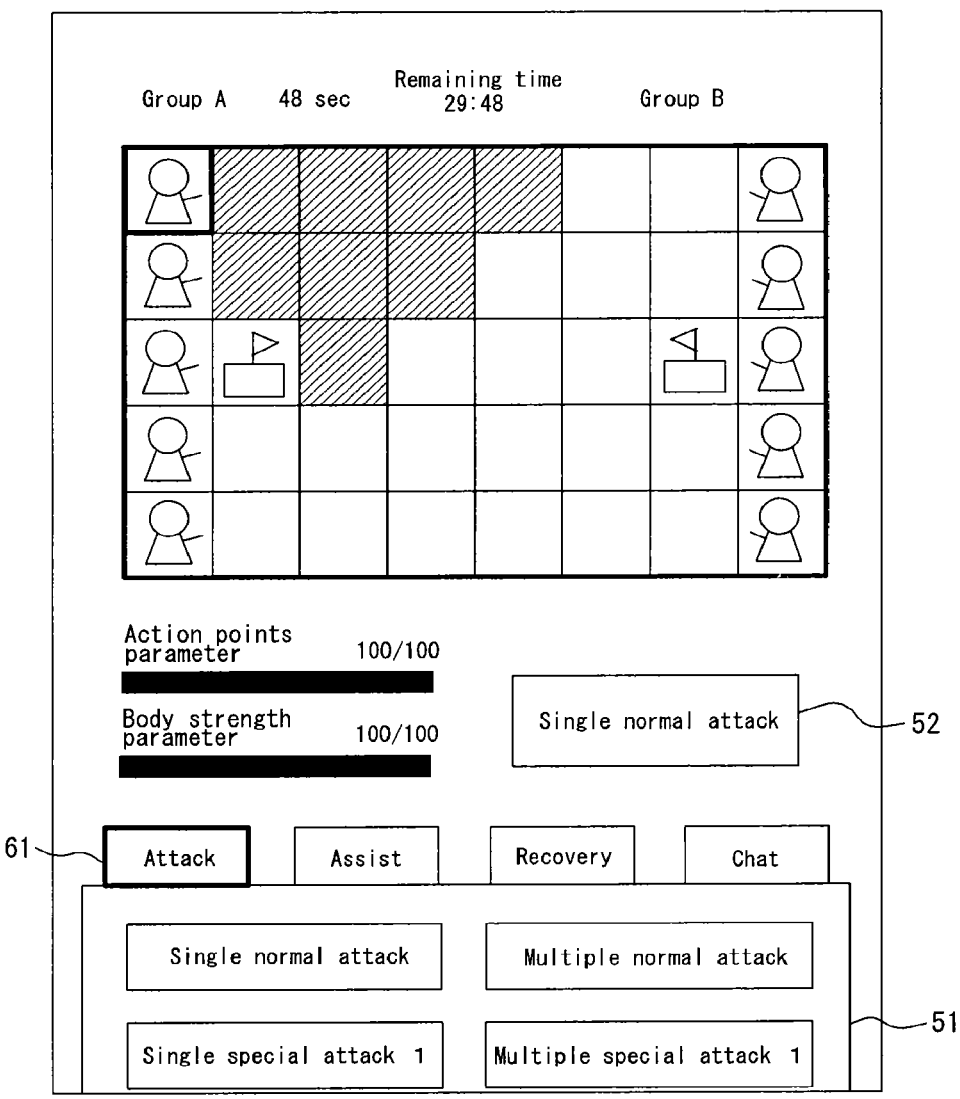
FIG. 10 is a diagram illustrating an example of the progress of the game.

In one minute of the turn of the group A, the player A1 may move the character A1 once. In order to move the character A1, the player A1 taps the square in the field in which the character A1 is positioned. Based on a tap operation of the player A1, the screen generation module 18 displays the square to which the character A1 may move in the field. The screen generation module 18, based on a movable range of the character A1 stored in, for example, the storage module 11, displays the square to which the character A1 may move in the field. The square to which the character A1 may move is displayed in various manners such as blinking, being emphasized and the like that are distinguishable by the player A1. According to the present embodiment, as illustrated in FIG. 10, the squares to which the character A1 may move are hatched. The player A1 may move the character A1 by selecting one of the squares from the hatched squares to which the character A1 may move.

Figure 11:
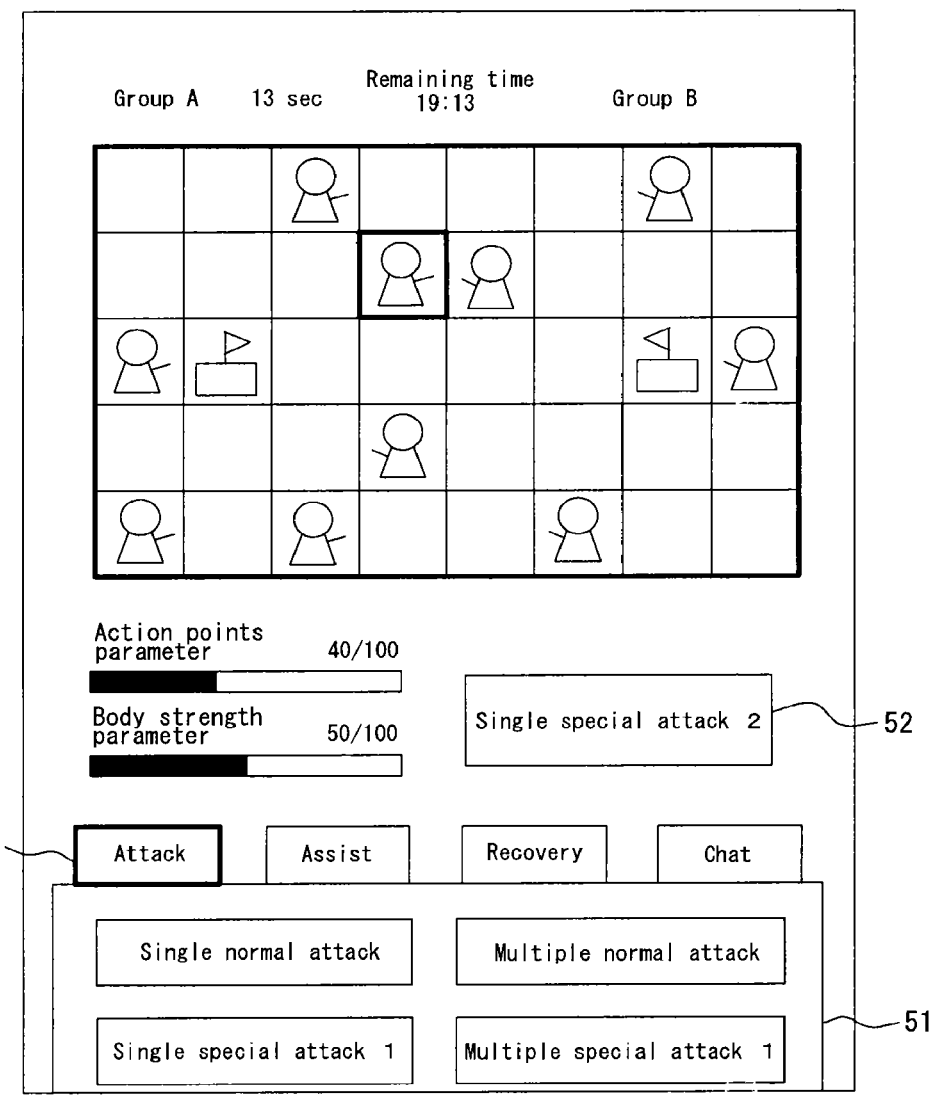
FIG. 11 is a diagram illustrating an example of the progress of the game.

The player A1, regardless of whether it is turn of the group A or the group B, may select the action in the first area 51 or in the second area 52 and cause the character A1 to execute the action. FIG. 11 illustrates an example of the display screen displayed during the progress of the game. In FIG. 11, the action "single special attack 2", which is selected from the attack category by the player A1 last time, is extracted by the extraction module 19 and displayed in the second area 52. Until the action points parameter of the character A1 falls down to be lower than the action points parameter necessary for the execution of the "single special attack 2", or until the remaining number of usable times of the "single special attack 2" becomes zero, the player A1 may repeatedly select the "single special attack 2". Since the player A1 has selected the "single special attack 2" last time, it is expected that the player A1 considers the "single special attack 2" as an effective action in the game situation illustrated in FIG. 11. Therefore, it is highly likely that the player A1 repeatedly selects the "single special attack 2" until the "single special attack 2" may become no longer available. Here, when the player A1 selects the "single special attack 2" from the first area 51, since a portion of the first area 51 displayed in the display screen does not include the action "single special attack 2" due to the limitation on size of the screen, the player A1 needs to flick or swipe the display screen and display the action "single special attack 2". According to the present embodiment, however, in the second area 52 displayed in the first view, the action "single special attack 2" selected last time is selectably displayed. Therefore, the player A1 may select the action "single special attack 2" without flicking or swiping the display screen so as to display the action the player A1 desires to repeatedly use. Especially in a real-time battle game such as one according to the present embodiment, the player generally wishes to act quickly. Therefore, the information processing device 10, by simplifying an operation to select the action, may save the player the trouble of flicking or swiping and thus is likely to satisfy the player's wish to quickly select the action. Note that, when the player wishes to select an action other than the action displayed in the second area 52, the player may select the desired action from the first area 51.

When the player A1 selects the action under the attack category, the progress processing module 17 reduces the health point parameter of any one of the characters of the group B positioned in a square around the character A1 (for example, a square adjacent to the character A1 in a horizontal or vertical direction). In FIG. 11, since a character of the group B is positioned in the square on the right side of the character A1, the progress processing module 17 reduces the health point parameter of the character of the group B based on the attack power parameter of the character A1 and the defense power parameter of the character of the group B, with reference to the effect of the single special attack 2 selected by the player A1.

Figure 12:
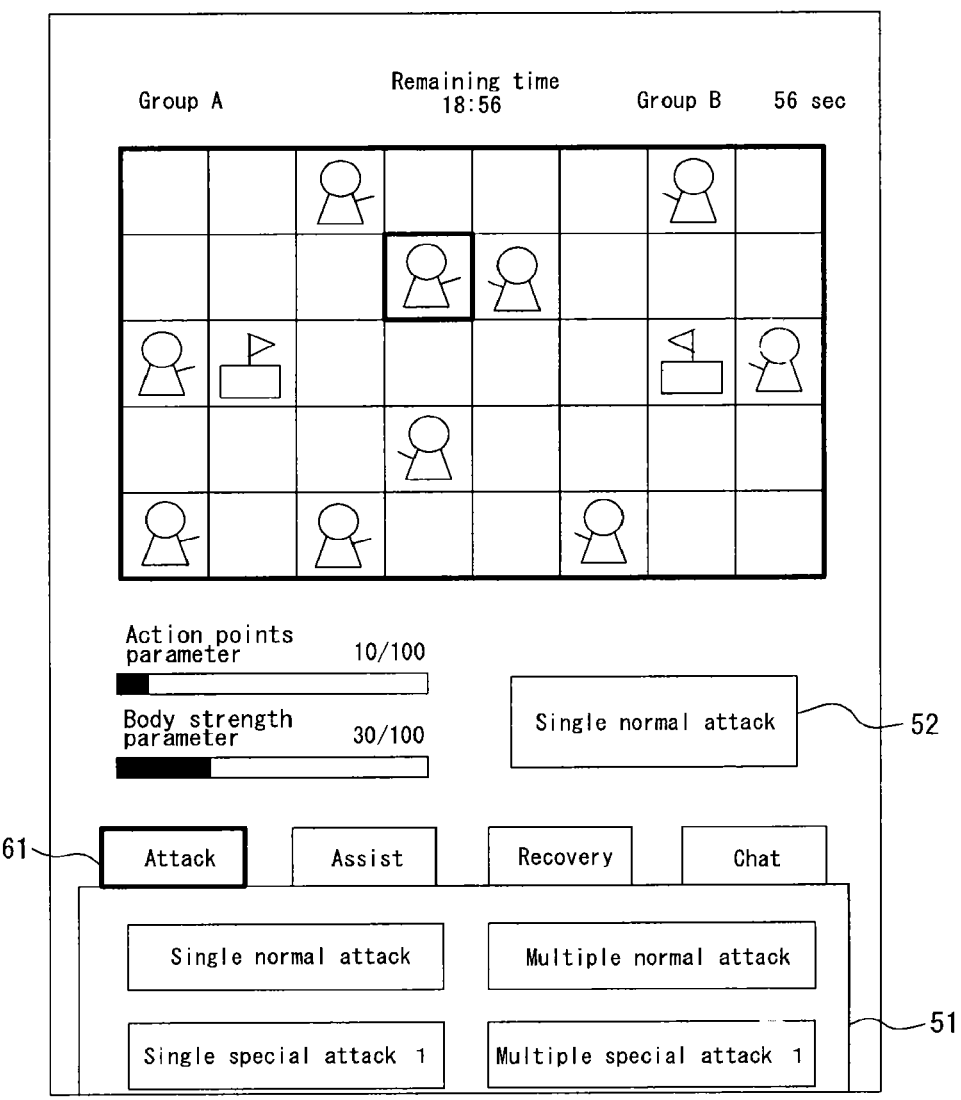
FIG. 12 is a diagram illustrating an example of the progress of the game.

When the player A1 repeatedly selects the action "single special attack 2" and the action points parameter of the character A1 falls under the action points parameter necessary for the execution of the "single special attack 2", or when the remaining number of usable times of the "single special attack 2" becomes zero, the extraction module 19, following the flow in FIG. 8, extracts the "single normal attack 2" serving as the default action. Therefore, although the player A1 has selected the action "single special attack 2" last time, the "single normal attack 2" is displayed in the second area 52 as illustrated in FIG. 12.

When a plurality of characters of the group B are positioned around the character A1 and the player A1 selects an action under the attack category for affecting one character, the progress processing module 17, for example, autonomously or based on an input by the player A1, selects one of the characters of the group B positioned around the character A1 and reduces the health point parameter of the selected character.

When a plurality of characters of the group B are positioned around the character A1 and an action under the attack category for affecting a plurality of characters (for example, "multiple normal attack") is selected, the progress processing module 17 reduces the health point parameters of the plurality of characters of the group B positioned around the character A1.

Figure 13:
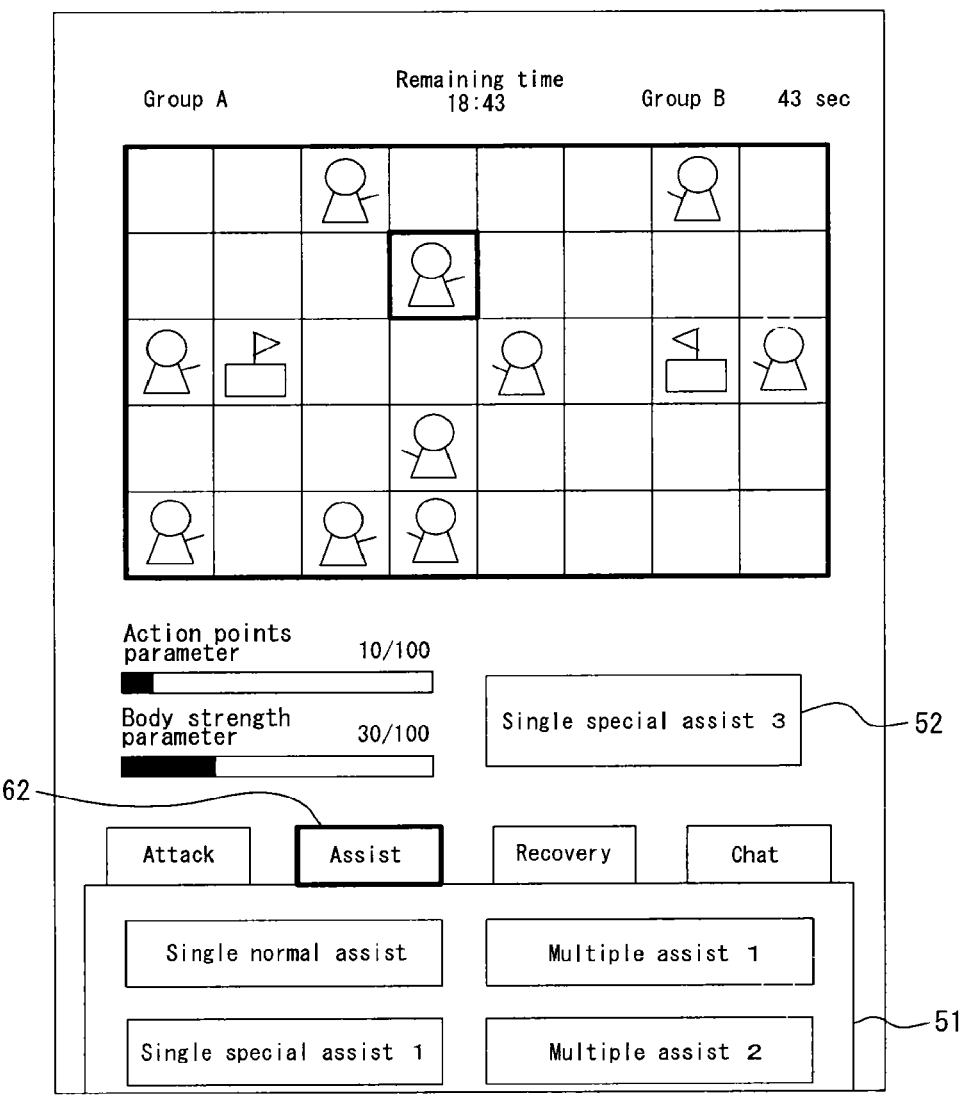
FIG. 13 is a diagram illustrating an example of the progress of the game.

Next, FIG. 13 illustrates the display screen displayed when the player A1 selects the assist tab 62 by the tap operation. When the player A1 selects the assist tab 62, a list of actions under the assist category is displayed in the first area 51. Also, a specific action extracted by the extraction module 19 from the actions under the assist category is displayed in the second area 52. That is, in conjunction with the tab selected by the player, the second area 52 displays different actions. In an example illustrated in FIG. 13, "single special assist 3" selected by the player A1 last time from the actions under the assist category is displayed.

When the action points parameter of the player A1 falls under the action points parameter necessary for the execution of the "single special assist 3", "single normal assist" serving as the default action is displayed in the second area 52.

The player A1 may select "single special assist 3" displayed in the second area 52, or another action displayed in the first area 51. When the player A1 selects the action under the assist category for affecting one character, the progress processing module 17 checks which one of the groups, the group A or the opponent group B, the effect of the selected action is directed to.

When the progress processing module 17 determines that the effect of the selected action is directed to the group A, the progress processing module 17, autonomously or based on the input by the player A1, selects any one of the characters of the group A in the field. Then, based on the effect of the selected action, the progress processing module 17 increases the attack power parameter, the defense power parameter, or both of them of the selected character for a predetermined period. The progress processing module 17 may increase the combat power parameter of the character selected by the tap operation of the player A1. When the character with the increased combat power parameter attacks an opponent character or is attacked by the opponent character, the progress processing module 17 changes the health point parameter based on the combat power parameter that has been increased.

When the progress processing module 17 determines that the effect of the selected action is directed to the opponent group B, the progress processing module, autonomously or based on the input of the player A1, selects any one of the characters of the opponent group B in the field. Then, based on the effect of the selected action, the progress processing module 17 reduces the attack power parameter, the defense power parameter, or both of them of the selected character for a predetermined period. The progress processing module 17 may reduce the combat power parameter of the character selected by the tapping operation or the like of the plyer A1.

When the player A1 selects the action under the assist category (for example, "plurality assist 1") for affecting a plurality of characters, the progress processing module 17 checks which one of the groups, the group A or the opponent group B, the effect of the selected action is directed to. The progress processing module 17, based on the effect of the selected action, increases the combat power parameters of a plurality of characters of the group A in the field for a predetermined period, or reduces the combat power parameters of a plurality of characters of the opponent group B in the field for a predetermined period.

Note that the progress processing module 17, either in the operation for the action for affecting one character or in the operation for the action for affecting a plurality of characters, may increase or reduce the combat power parameter of a character positioned around the character A1 alone.

Figure 14:
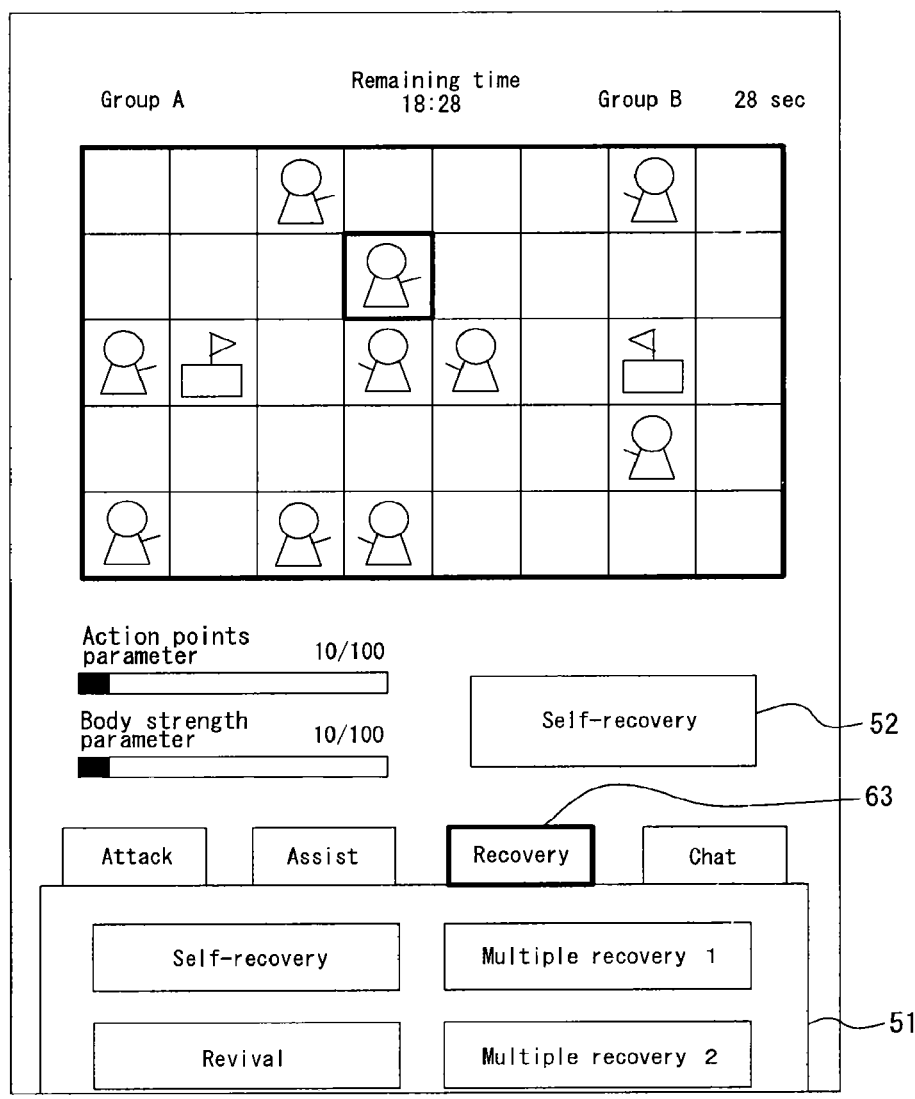
FIG. 14 is a diagram illustrating an example of the progress of the game.

Next, FIG. 14 illustrates the display screen displayed when the player A1 selects the recovery tab 63 by the tap operation. When the player A1 selects the recovery tab 63, a list of the actions under the recovery category is displayed in the first area 51. Also, a specific action extracted by the extraction module 19 from the actions under the recovery category is displayed in the second area 52. According to the present embodiment, it is assumed that the player A1 has not selected an action under the recovery category since the start of the game. In this case, as illustrated in FIG. 14, an action "self-recovery" serving as a default action under the recovery category is displayed in the second area 52.

When the player A selects the action "self-recovery", the progress processing module 17 increases the health point parameter of the character A1 by a predetermined amount or at a predetermined ratio. The progress processing module 17 increases the health point parameter of the character A1 by, for example, 50.

When the player A1 selects the action under the recovery category (for example, "plural recovery 1") for affecting a plurality of characters, the progress processing module 17, based on the effect of the selected action, increases the health point parameters of a plurality of characters of the group A in the field by a predetermined amount or at a predetermined ratio.

An action "revival" is an action that may be selected when the health point parameter of the character falls down to 0 or lower and cannot participate in the game anymore. When the health point parameter of the character A1 falls down to 0 or lower and the player A1 selects the action "revival", the character A1, during the game, may participate in the game again with the health point parameter at 100. Note that the progress processing module 17 may limit the number of usable times of the "revival" to a predetermined number (for example, one). Or, the progress processing module 17 may allow the character to participate in the game again by selecting the "revival" with the health point parameter at a preliminarily reduced value (for example, 50, which is a half value of the original).

When the health point parameter of the character A1 falls down to 0 or lower, the player A1 cannot select any action other than the "revival". Therefore, the extraction module 19 may preferentially extract the "revival" to be displayed in the second area 52. In this case, the screen generation module 18 displays the action "revival" in the second area 52. Also, the screen generation module 18, when the health point parameter of the character A1 falls down to 0 or lower, regardless of whether the recovery tab 63 is selected, may autonomously display the recovery tab 63 being selected in the display screen and also display the action "revival" in the second area 52. Thereby, after the health point parameter of the character A1 falls down to 0 or lower, the player A1 may select the action "revival" without selecting the tab and the like, which allows the player A1 to save time before participating in the game again as compared with a case in which the player A1 selects the tab.

Figure 15:
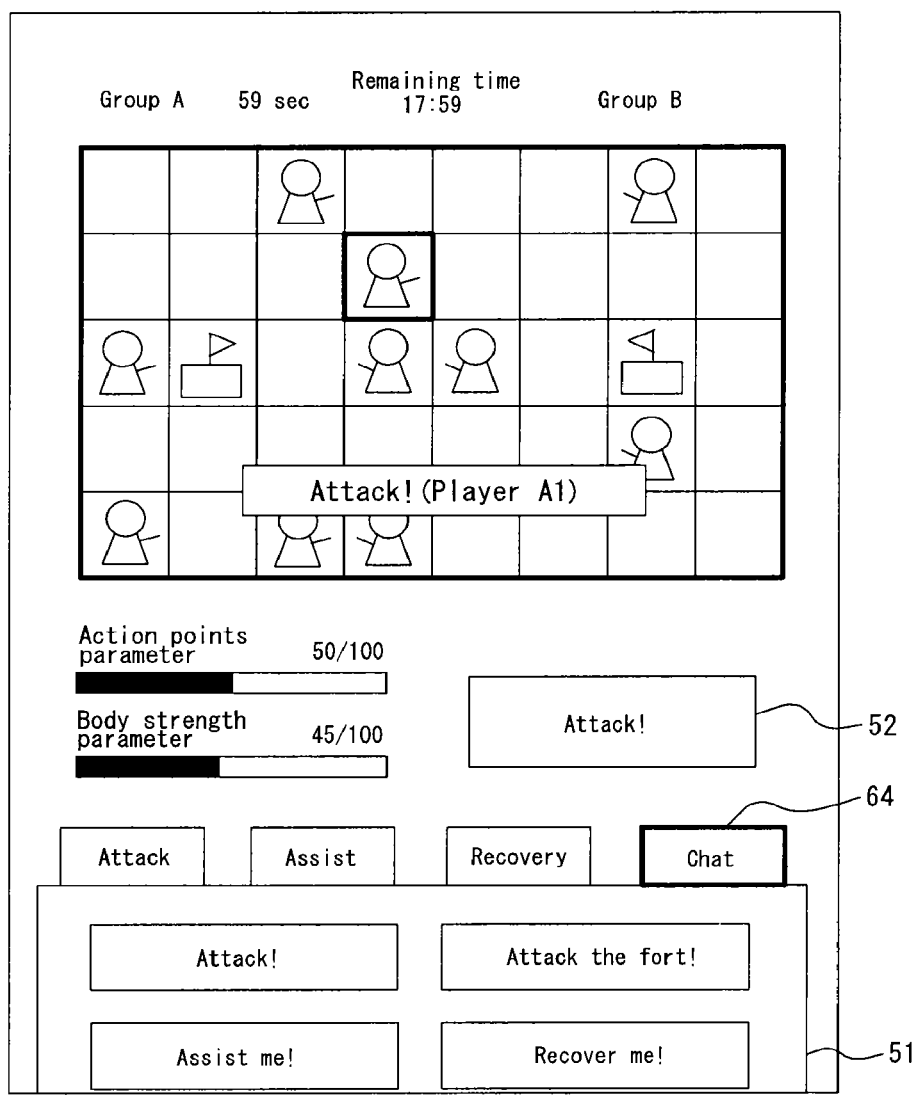
FIG. 15 is a diagram illustrating an example of the progress of the game.

Next, FIG. 15 illustrates the display screen displayed when the player A1 selects a chat tab 64 by the tap operation. When the player A1 selects the chat tab 64, a plurality of fixed phrases usable in the chat are displayed in the first area 51. Also, the fixed phrase extracted by the extraction module 19 is displayed in the second area 52. When the player A1 has not selected the fixed phrase since the start of the game, a default phrase corresponding to the default action is displayed in the second area 52.

When the player A selects any one of the fixed phrases, the screen generation module 18 displays the selected phrase in the display screen of each player of the group A to which the player A belongs. The screen generation module 18 may display the fixed phrase in Timeline that may be viewed only by the players of the group A. Or, the screen generation module 18, as illustrated in FIG. 15, may display the fixed phrase in the filed in an overlapping manner for a predetermined period. Or, the screen generation module 18 may display the fixed phrase in a moving (rolling) manner from the right to the left of the field or from the bottom to the top of the field.

Note that, in using the chat function, each player may input a comment other than the fixed phrases by using a keyboard displayed in the display module 32. In this case, the screen generation module 18 may display the input comment in the display screen.

When viewing the fixed phrase or the comment displayed in the display screen, each player may operate the character based thereon. The chat function allows the players to communicate with each other and to have a sense of unity that the players are advancing the game together as a group.

Figure 16:
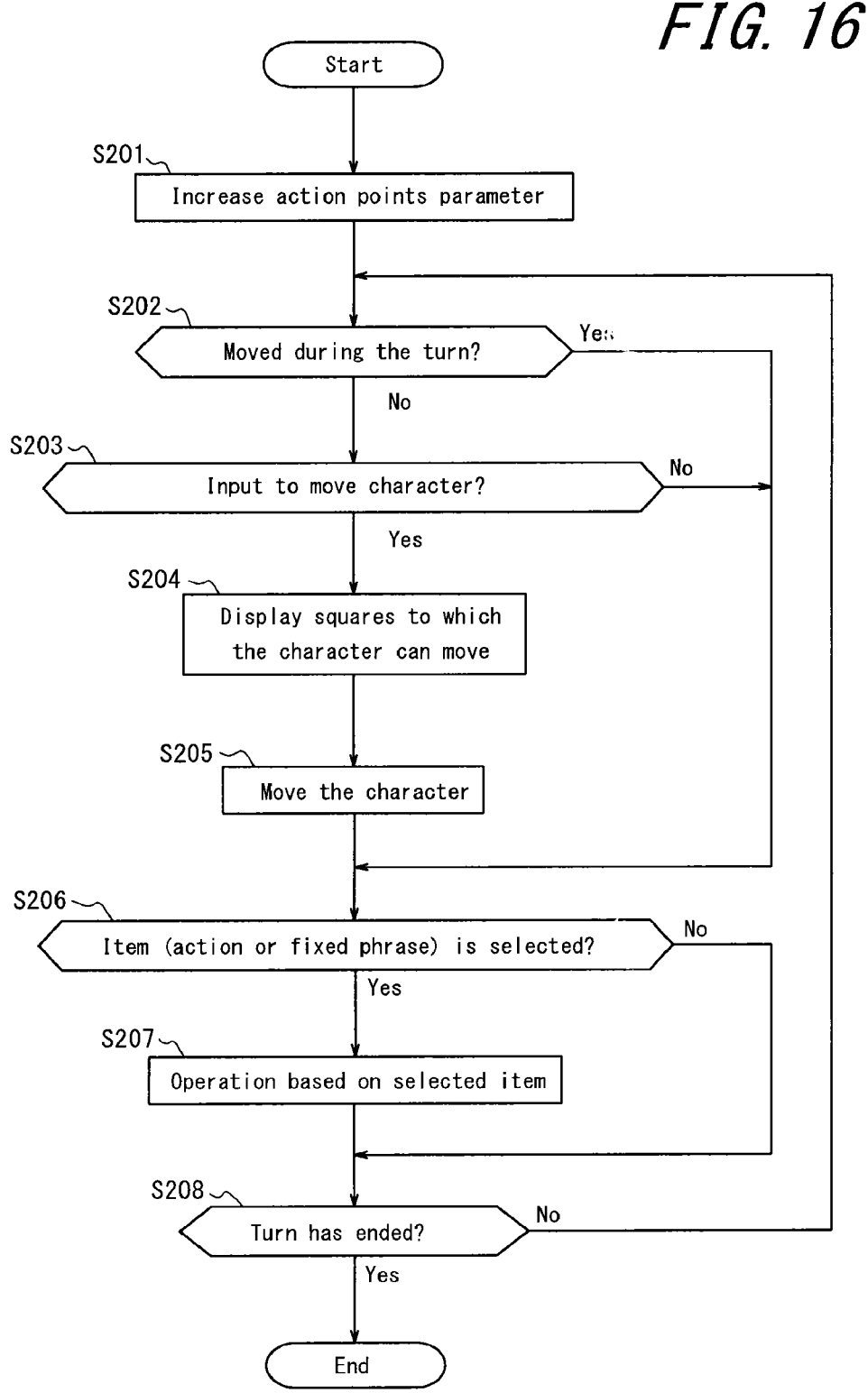
FIG. 16 is a flowchart illustrating an example of an operation carried out by an information processing device.

Next, the operation carried out by the information processing device 10 according to the present embodiment will be described with reference to a flowchart illustrated in FIG. 16 for illustrative purposes. FIG. 16 illustrates an example of the operation executed for any one of the characters of the group on the turn.

The progress processing module 17 increases the action points parameter of the character of the group on the turn (step S201).

Next, the progress processing module 17 determines whether the character subjected to this operation has moved during the turn of the group (step S202).

When the progress processing module 17 determines that the character has moved (Yes at step S202), the flow proceeds to step S206.

When the progress processing module 17 determines that the character has not moved (No at step S202), the progress processing module 17 determines whether the player has input an operation to move the character (step S203). The operation to move the character, in the example described above with reference to FIG. 9, is the operation to tap the square in which the character of the player is positioned.

When the progress processing module 17 determines that the operation to move the character has not been input (No at step S203), the flow proceeds to step S206.

When the progress processing module 17 determines that the operation to move the character has been input (Yes at step S203), the screen generation module 18 refers to the information stored in the storage module 11 and displays a square to which the character may move (step S204).

Then, the screen generation module 18, based on the player's input, moves the character (step S205).

Next, the progress processing module 17 determines whether the player has selected an item (step S206). The item may be the action under the attack category, the assist category, or the recovery category, or the fixed phrase of the chat function.

When the progress processing module 17 determines that the player has not selected an item (No at step S206), the flow proceeds to step S208.

On the other hand, when the progress processing module 17 determines that the player has selected an item (Yes at step S206), the progress processing module 17 carries out an operation based on the selected item (step S207). The operation based on the selected item is, for example, changing various parameters and displaying the fixed phrase in the display screen.

Then, the progress processing module 17 determines whether the turn of the group of the player subjected to the operation has ended (step S208). The progress processing module 17 makes this determination by referring to the game time.

When the progress processing module 17 determines that the turn has not ended (No at step S208), the flow returns to step S202. Then, the progress processing module 17 repeats the operation from step S202 to step S208 until determining that the turn has ended.

When the progress processing module 17 determines that the turn has ended (Yes at step S208), the flow ends. Next, it is turn for the opponent's turn.

During the opponent's turn, the progress processing module 17, to the character subjected to the operation of the flow in FIG. 16, repeats the operation from step S206 to step S208 in FIG. 16. Thereby, the character subjected to the operation, during the opponent's turn, may execute an action or use the chat function.

As described above, according to the information processing device 10 of the present embodiment, the screen generation module 18 displays a plurality of items in the first area 51 and the specific item extracted by the extraction module 19 in the second area 52. Since the second area is positioned at a specific position in the game screen, the player may quickly display and select the second area 52. According to the present embodiment, especially, since the second area 52 is displayed in the first view 56, the player may select the item displayed in the second area 52 without carrying out the cumbersome operations such as flicking or swiping. Also, the specific item extracted according to the present embodiment is the item selected by the player last time. Since it is assumed that the player selects the item that is considered as effective in each situation, the player is highly likely to repeatedly select the item selected by the player last time. Since the specific item is displayed in the second area 52, which is selectably displayed in the first view 56, the item that is highly likely to be selected by the player may be displayed in the first view 56. Accordingly, since the number of operations operated by the player to find a desired item in the entire game may be reduced, the information processing device 10 may reduce the complication of the operation. Especially, in order for the player to find an item, the player needs to look for the item by flicking or swiping and carry out the tap operation to select the item. According to the information processing device 10, however, in order for the player to select the specific item displayed in the second area 52, the player may select the item by carrying out the tap operation to the specific item. Therefore, the complication of the operation is significantly reduced.

Also, since the complication of the operation is reduced, the player may save time between thinking and selecting the item. Therefore, the player may cause the character to quickly execute the action and, also, concentrate more on the game.

Although the disclosure has been described based on the figures and the embodiment, it is to be understood that various modifications and changes may be implemented based on the present disclosure by those who are ordinarily skilled in the art. Accordingly, such modifications and changes are included within the scope of the present disclosure. For example, functions and the like included in each means or each step may be rearranged without logical inconsistency, so as to combine a plurality of means or steps together or to divide them.

Although in the above embodiment the game having the first mode and the second mode has been described, the information processing device 10 may provide the player with the second mode in the above embodiment as an independent game.

Also, each player, during the second mode described in detail in the above embodiment, may advance the game in the first mode. Based on the progress of the game in the first mode made by each player, the progress processing module 17 may increase or reduce various parameters in the second mode. For example, based on the progress of the game in the first mode, the progress processing module 17 may increase the action points parameter of the character of the player who has advanced the first mode.

Figure 17:
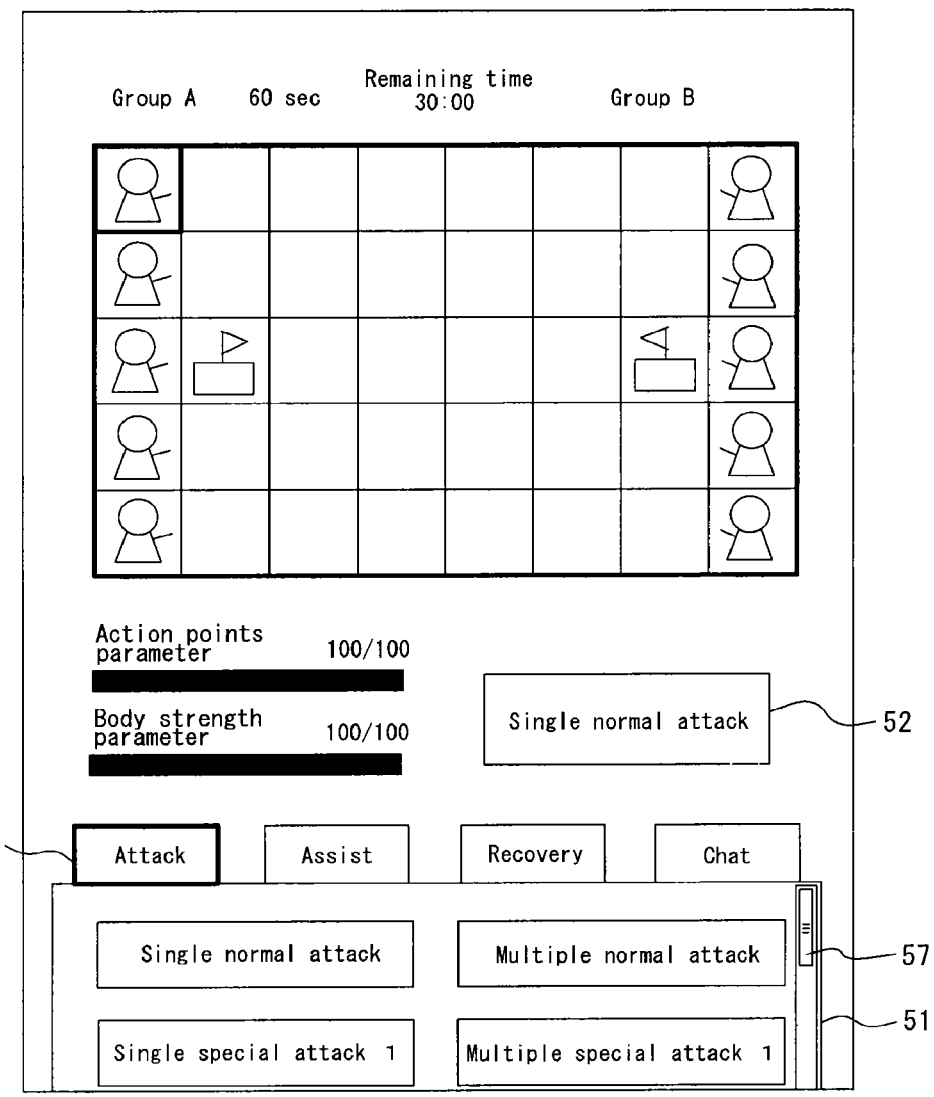
FIG. 17 is a diagram illustrating a variation of the game screen.

Also, although in the above embodiment the player flicks or swipes the display screen, an operation to change the range displayed on the display screen is not limited thereto. The player may change the displayed range by, for example, moving a scroll bar up and down. The scroll bar may scroll, rather than the entire display screen, a portion of the displayed range desired to change. As illustrated in FIG. 17, for example, the scroll bar may be provided to the first area 51 alone. The player, by scrolling the first area 51, may view all items therein.

The extraction module 19 may extract the specific item by employing various methods other than the method described in the above embodiment. Preferably, the extraction module 19, from a plurality of items displayed in the first area 51, extracts the item that is highly likely to be selected by the player as the specific item.

The extraction module 19, for example, extracts a highly effective item in the battle status of the game. An example of the extraction of the highly effective item by the extraction module 19 will be described by, in a manner similar to FIG. 11, using an example in which the player A1 causes the character A1 to execute the action under the attack category.

For example, the extraction module 19, based on the positions of the characters in the field, may extract an action for affecting more characters as the highly effective action. In particular, for example, when a plurality of characters of the opponent group B are positioned around the character A1, the extraction module 19 may extract the action for affecting a plurality of characters under the category of the selected tab. At this time, the extraction module 19 may extract the action for affecting a plurality of characters that has been selected by the player A1 last time. Or, the extraction module 19 may extract the default action for affecting a plurality of characters predetermined by the progress processing module 17. When the action for affecting a plurality of characters is displayed in the second area 52, the character A1 may damage a plurality of characters of the group B and effectively reduce the health point parameters of the characters.

The extraction module 19 may extract an action that is highly effective in a particular situation when the particular situation occurs. For example, when the character A1 may execute an action that may reduce the health point parameter of an opponent character more in inverse proportion to the value of the health point parameter of the representative game medium of the group A1 to which the character A1 belongs, the extraction module 19 may extract such an action when the value of the health point parameter of the representative game medium falls down to a predetermined value or lower. Thereby, the player A1, in the situation when the action is highly effective, may easily select the action.

Also, for example, when the character A1 may execute an action that has different effects based on the number of execution times thereof, the extraction module 19 refers to the number of execution times of the action during the game and extracts the action to be displayed in the second area 52. The progress processing module 17 stores, as the number of execution times of the action, the number of selection times of the action by each player in the storage module 11.

For example, when the character A1 may execute an action that may reduce the health point parameter of the opponent character more in proportion to the number of execution times of the action under the attack category executed by the character of the group A during the game, the extraction module 19 extracts this action when the number of execution times of the action under the attack category reaches a predetermined number. Thereby, the player A1 may easily select this action when the action is highly effective. Note that in this example the screen generation module 18 may display the executed action under each category at the top of the field in the display screen, for example.

Note that although in the example described above the action under the attack category is executed, the extraction module 19 may extract an action under the assist category and an action under the recovery category in a similar manner.

Also, the number of specific items extracted by the extraction module 19 is not limited to one. The extraction module 19 may extract two or more items as the specific items. The extraction module 19 may extract, for example, two specific items. The extraction module 19 may extract two specific items in various combinations.

The extraction module 19 may extract, for example, one action for affecting a single character and an action for affecting a plurality of characters. In this case, the second area 52 displays two actions: the action for affecting a single character and the action for affecting a plurality of characters. The player, based on the position of the character in the field and the battle status of the game, may select the action displayed in the second area 52.

Also, the extraction module 19 may extract, for example, each one of the action selected by the player last time and the highly effective action described above. In this case, the second area 52 displays both the action selected by the player last time and the highly effective action. The player, based on the position of the character in the field and the battle status of the game, may select the action displayed in the second area 52.

Although in the above embodiment the extraction module 19 extracts the specific item from a plurality of items under the category of the selected tab, the specific item extracted by the extraction module 19 does not need to be included in the plurality of items under the category of the selected tab. For example, when the player selects the action under the attack category in the attack tab 61 and then selects another tab (for example, the assist tab 62), the extraction module 19 may extract, rather than the specific item from a plurality of items under the category of the newly selected tab, the action under the attack category selected by the player last time. Accordingly, for example, when the player selects another tab by mistake, the player may repeatedly select the same action by selecting the action selected by the player last time displayed in the second area 52.

Also, for example, when the health point parameter of the character falls down to the predetermined value or lower and the recovery tab 63 is not selected, the extraction module 19 may extract the action under the recovery category. In this case, regardless of the tab being selected, the second area 52 displays the action under the recovery category that increases the health point parameter of the character of the player. Since the player may increase the health point parameter of the character by selecting the action displayed in the second area 52, the player may easily prevent the health point parameter from falling down to zero. At this time, the screen generation module 18 may display the recovery tab 63 as the selected tab in the display screen. In this case, the display screen displays the recovery tab 63 being autonomously selected.

Also, the extraction module 19 may extract an item under each category preliminarily registered by the player. In this case, the player, prior to the start of the game, inputs the item under each category which the player wishes to display in the second area 52 by using the input module 31. The control processor 16 controls the storage module 11 to store the input item. The extraction module 19 extracts the item by referring to the information stored in the storage module 11.

Further, the extraction module 19 may newly generate a fusion item made up of a combination of actions under a plurality of categories and extract the fusion item to be displayed in the second area 52. An example in which the extraction module 19 generates the fusion item made up of a combination of actions under two categories will be described. The extraction module 19, among four tabs, selects two tabs used by the player more often during the game. Here, it is assumed that the extraction module 19 selects the attack tab 61 and the recovery tab 63. The extraction module 19 selects one item each under the attack category and the recovery category corresponding to the attack tab 61 and the recovery tab 63, respectively. The extraction module 19, for example, extracts the action selected by the player last time from each category as described above. Here, it is assumed that the extraction module 19 extracts the "single special attack 2" under the attack category and the "self-recovery" under the recovery category. The extraction module 19 newly generates a fusion action by combining these two actions. In this example, the extraction module 19 generates a fusion action having a combination of the effects of the "single special attack 2" and the self-recovery". The fusion action thus generated is displayed in the second area 52 by the screen generation module 18. When the player selects the fusion item displayed in the second area 52, the progress processing module 17 reduces the health point parameter of the opponent character according to the effect of the "single special attack 2" and, also, increases the health point parameter of the character operated by the player according to the effect of the "self-recovery". Note that, referring to FIG. 3, the value of the action points parameter necessary for the character to execute the generated action is "15", which is a total of "10" of the single special attack 2" and "5" of the "self-recovery". Since generation of such a fusion item by the extraction module 19, as compared to the case where the player selects a plurality of actions by selecting a plurality of tabs, allows execution of a plurality of actions by a single touching operation (selection) of the player, the cumbersome operations are reduced.

Also, in the field used for the battle of the game, each square may have a field attribute. Here, each square has any one of a field attribute 1, a field attribute 2, and a field attribute 3. The field attribute of each square is stored, for example, in the storage module 11. The field attribute increases the effect of the action of the character positioned in the square of interest. Here, the field attribute 1 increases the effect of the action under the attack category, the field attribute 2 increases the effect of the action under the assist category, and the field attribute 3 increases the effect of the action under the recovery category.

When the field attribute is provided as described above, the extraction module 19 may extract the action by referring to the field attribute of the square in which the character is positioned. For example, when the character is positioned in the square with the field attribute 1, the extraction module 19, even when the attack tab 61 is not selected, may extracts the action under the attack category which effect is increased due to the characteristics of the field attribute 1. In this case, regardless of the tab being selected, the second area 52 displays the action under the attack category. When the player selects the action displayed in the second area 52, the progress processing module 17, by referring to the effect of the selected action and the effect of the field attribute 1, for example, increases the attack power parameter of the player's character while allowing the player's character to battle against the opponent character and reducing the health point parameter of the opponent character. Such extraction by the extraction module 19 facilitates the player's selection of the highly effective action. In this example, the screen generation module 18 may display the attack tab 61 as the selected tab in the display screen. In this case, the display screen displays the attack tab 61 being autonomously selected.

When the character is positioned in the square with the field attribute 2 or the field attribute 3, the extraction module 19, in a manner similar to the above example, extracts the action under the assist category or the action the recovery category. Note that the field attribute does not need to be provided to all squares in the field but may be provided to some squares.

In the information processing system 100 in the above embodiment, also, some or all of the operations of the information processing device 10 (a server device) may be carried out by a native app installed in the terminal device 100 so as to provide the game as a native game.

In the information processing system 100 in the above embodiment, also, the screen displaying the progress of the game may be a web display displayed in the terminal device 30 based on data generated by the information processing device 10, and other screens such as a menu screen may be a native display displayed by the native app installed in the terminal device 30. In this manner, the information processing system 100 may provide a hybrid game having operations carried out by the information processing device 10 and the terminal device 30 in a sharing manner.

Further, an information processing device such as a computer or a mobile phone may be preferably used to function as the information processing device 10 in the above embodiment. Such an information processing device may be implemented by storing a program with a description of an operation to execute each function of the information processing device 10 according to the above embodiment in the storage module 11 of the information processing device 10 and causing the CPU of the information processing device 10 to read and execute the program.

A hardware description of an exemplary information processing device 10 for performing one or more of the embodiments described herein is described with reference to FIG. 18. In addition, the hardware described by FIG. 18 can also apply to the terminal device 30, such as a computer or mobile device. When the information processing device 10 and/or terminal device 30 are programmed to perform the processes associated with executing the game described herein, the information processing device 10 and/or terminal device becomes a special purpose device.

The information processing device 10 includes a CPU 1800 that perform the processes described herein. The process data and instructions may be stored in memory 1802. These processes and instructions may also be stored on a storage medium disk 1804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the information processing device 10 communicates, such as the terminal device 30.

Further, the claimed advancements may be provided as a utility application, background daemon, or component of an operating system, or combination thereof, executing in conjunction with CPU 1800 and an operating system such as Microsoft Windows, UNIX, Solaris, LINUX, Apple MAC-OS and other systems known to those skilled in the art.

CPU 1800 may be a Xenon or Core processor from Intel of America or an Opteron processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

Figure 18:
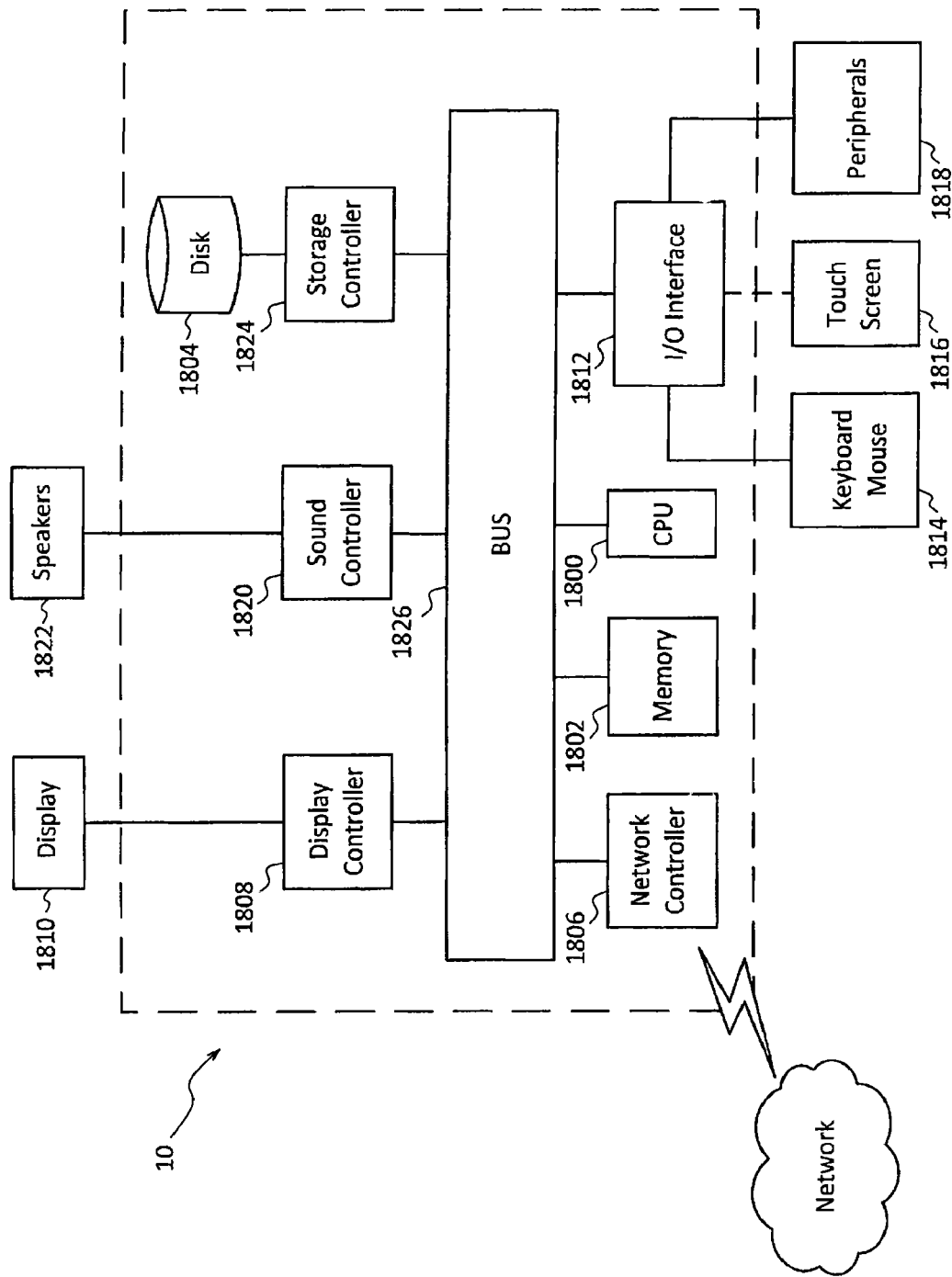
FIG. 18 is an exemplary block diagram of an information processing device.

The information processing device 10 in FIG. 18 also includes a network controller 1806, such as an Intel Ethernet PRO network interface card from Intel Corporation of America, for interfacing with a network. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The information processing device 10 further includes a display controller 1808, such as a NVIDIA GeForce GTX or Quadro graphics adaptor from NVIDIA Corporation of America for interfacing with display 1810 of the information processing device 10 and the terminal device 30, such as an LCD monitor. A general purpose I/O interface 1812 at the information processing device 10 interfaces with a keyboard and/or mouse 1814 as well as a touch screen panel 1816 on or separate from display 1810. General purpose I/O interface 1812 also connects to a variety of peripherals 1818 including printers and scanners.

A sound controller 1820 is also provided in the information processing device 10, such as Sound Blaster X-Fi Titanium from Creative, to interface with speakers/microphone 1822 thereby providing sounds and/or music.

The general purpose storage controller 1824 connects the storage medium disk 1804 with communication bus 1826, which may be an ISA, EISA, VESA, PCI, or similar, for interconnecting all of the components of the information processing device 10. A description of the general features and functionality of the display 810, keyboard and/or mouse 1814, as well as the display controller 808, storage controller 1824, network controller 1806, sound controller 1820, and general purpose I/O interface 1812 is omitted herein for brevity as these features are known. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The invention claimed is:

1. A system comprising:
   circuitry configured to:
   determine whether a first action satisfies a first condition,
   set a specific action, wherein
      when it is determined that the first condition is satisfied, the specific action is the first action,
      when it is not determined that the first condition is satisfied, the specific action is a second action different from the first action,
   display, on a first area of a game screen, a part of a plurality of actions a game character operated by a player can execute, wherein the part of the plurality of actions displayed are selectable by a user,
   display, on a second area of the game screen different from the first area, the specific action, wherein the specific action displayed is selectable by the user,
   in response to a selection of an action displayed in the first area by the user, execute the selected action by the game character,
   in response to a selection of the specific action displayed in the second area by the user, execute the specific action by the game character, and
   in response to the first condition not being satisfied, display a third action different from the first action as the specific action on the second area.

2. The system according to claim 1, wherein the first action is an action selected by the user and executed by the game character operated by the user.

3. The system according to claim 1, wherein the circuitry is further configured to store an action selected by the user and executed by the game character in a memory as the first action.

4. The system according to claim 1, wherein the first condition includes at least one of:
   a condition that a rest number of times of the first action selectable by the player is one or more; and
   a condition that a value of a parameter associated with the game character is more than a lower limit value of the parameter necessary for executing the first action.

5. The system according to claim 1, wherein the specific action is set based on a number of times of each of the plurality of actions being selected.

6. The system according to claim 1, wherein an action selected by the player last time among the first action is set as the specific action.

7. A method comprising:
   determining whether a first action satisfies a first condition;
   setting a specific action, wherein
      when it is determined that the first condition is satisfied, the specific action is the first action,
      when it is not determined that the first condition is satisfied, the specific action is a second action different from the first action;
   displaying, on a first area of a game screen, a part of a plurality of actions a game character operated by a player can execute, wherein the part of the plurality of actions displayed are selectable by a user;
   displaying, on a second area of the game screen different from the first area, the specific action, wherein the specific action displayed is selectable by the user;
   in response to a selection of an action displayed in the first area by the user, executing the selected action by the game character;
   in response to a selection of the specific action displayed in the second area by the user, executing the specific action by the game character; and in response to the first condition not being satisfied, displaying a third action different from the first action as the specific action on the second area.

8. The method according to claim 7, wherein the first action is an action selected by the user and executed by the game character operated by the user.

9. The method according to claim 7, further comprising storing an action selected by the user and executed by the game character in a memory as the first action.

10. The method according to claim 7, wherein the first condition includes at least one of:
a condition that a rest number of times of the first action selectable by the player is one or more; and
a condition that a value of a parameter associated with the game character is more than a lower limit value of the parameter necessary for executing the first action.

11. The method according to claim 7, wherein the specific action is set based on a number of times of each of the plurality of actions being selected.

12. The method according to claim 7, wherein an action selected by the player last time among the first action is set as the specific action.

13. A non-transitory computer-readable storage medium including computer executable instructions, wherein the instructions, when executed by a computer, cause the computer to perform a method, the method comprising:
determining whether a first action satisfies a first condition;
setting a specific action, wherein
when it is determined that the first condition is satisfied, the specific action is the first action,
when it is not determined that the first condition is satisfied, the specific action is a second action different from the first action;
displaying, on a first area of a game screen, a part of a plurality of actions a game character operated by a player can execute, wherein the part of the plurality of actions displayed are selectable by a user;
displaying, on a second area of the game screen different from the first area, the specific action, wherein the specific action displayed is selectable by the user;
in response to a selection of an action displayed in the first area by the user, executing the selected action by the game character;
in response to a selection of the specific action displayed in the second area by the user, executing the specific action by the game character; and
in response to the first condition not being satisfied, displaying a third action different from the first action as the specific action on the second area.

14. The non-transitory computer-readable storage medium according to claim 13, wherein the first action is an action selected by the user and executed by the game character operated by the user.

15. The non-transitory computer-readable storage medium according to claim 13, further comprising storing an action selected by the user and executed by the game character in a memory as the first action.

16. The non-transitory computer-readable storage medium according to claim 13, wherein the first condition includes at least one of:
a condition that a rest number of times of the first action selectable by the player is one or more; and
a condition that a value of a parameter associated with the game character is more than a lower limit value of the parameter necessary for executing the first action.

17. The non-transitory computer-readable storage medium according to claim 13, wherein the specific action is set based on a number of times of each of the plurality of actions being selected.

18. The non-transitory computer-readable storage medium according to claim 13, wherein an action selected by the player last time among the first action is set as the specific action.

* * * * *